United States Patent [19]
Nagate et al.

[11] Patent Number: 5,508,576
[45] Date of Patent: Apr. 16, 1996

[54] ROTOR FOR BRUSHLESS ELECTROMOTOR

[75] Inventors: Takashi Nagate; Kenichi Endo; Yoshikazu Koike; Takeshi Seto; Yoshihiko Yamagishi, all of Suwa, Japan

[73] Assignee: Seiko Epson Corporation, Tokyo, Japan

[21] Appl. No.: 343,860

[22] Filed: Nov. 17, 1994

Related U.S. Application Data

[62] Division of Ser. No. 983,585, Feb. 4, 1993, Pat. No. 5,369,325.

[51] Int. Cl.$^6$ .............................. H02K 21/12; H02K 1/32
[52] U.S. Cl. .............................. 310/156; 310/64
[58] Field of Search .............................. 310/156, 261, 310/64, 187; 29/598

[56] References Cited

U.S. PATENT DOCUMENTS

| | | | |
|---|---|---|---|
| 4,322,646 | 3/1982 | Persson | 310/64 |
| 4,403,161 | 9/1983 | Miyashita et al. | 310/156 |
| 4,658,165 | 4/1987 | Vanderschaeghe | 310/156 |
| 4,845,837 | 7/1989 | Lloyd | 310/156 |
| 5,111,096 | 5/1992 | Horst | 310/261 |
| 5,223,759 | 6/1993 | Shimoda et al. | 310/156 |
| 5,258,678 | 11/1993 | Futami | 310/156 |
| 5,285,123 | 2/1994 | Kataoka et al. | 310/88 |
| 5,359,248 | 10/1994 | Nagate et al. | 310/156 |
| 5,369,325 | 11/1994 | Nagate et al. | 310/156 |
| 5,371,426 | 12/1994 | Nagate et al. | 310/156 |

FOREIGN PATENT DOCUMENTS 575733  10/1977  U.S.S.R. .............................. 29/598

*Primary Examiner*—Clayton E. LaBalle
*Attorney, Agent, or Firm*—Kanesaka & Takeuchi

[57] ABSTRACT

A rotor having permanent magnets for a brushless electromotor includes a yoke formed from a plurality of silicon steel sheets laminated together and provided along its outer periphery with even number of, at least four magnetic poles. The magnetic poles are alternately provided substantially at equal distances from a rotational axis with slots to receive the respective permanent magnets such that the sides of the permanent magnets facing a rotary shaft have the same polarity. As a result, a compact and efficient rotor is obtained, and damage to or flying off of the permanent magnets is prevented.

5 Claims, 28 Drawing Sheets

ROTOR FOR BRUSHLESS ELECTROMOTOR

CROSS-REFERENCES TO RELATED APPLICATION

This is a divisional application of Ser. No. 983,585 filed Feb. 4, 1993, now U.S. Pat. No. 5,369,325.

FIELD OF THE INVENTION

The present invention relates to brushless electromotors suitable for operation at high speed with high efficiency and more particularly to a rotor for use with such brushless electromotors.

BACKGROUND OF THE INVENTION

The brushless electromotors generally have a cylindrical rotor provided on the outer peripheral surface thereof with permanent magnets made of ferrite or the like.

FIG. 28 shows a conventional brushless electromotor. The brushless electromotor 1 includes a motor casing (i.e. stator) 2 which consists of a cylindrical side wall 3, and a front face plate 4 and a rear face plate 5, both of which are employed to close opposite ends of the side wall 3. Inside the side wall 3, there are provided a plurality of driving coils 6 arranged in a cylindrical form and fixed to the inner surface of the side wall 3. A rotary shaft 8 is fixed concentrically to a rotor 7. The rotary shaft 8 projects from opposite ends of the rotor 7 so that it is supported at one end in a bearing 10 held in an opening 9 of the rear face plate 5 and at the other end in a bearing 12 held in an opening 11 of the front face plate 4. An annular member 13 is provided inside the side wall 3 of the motor casing 2 to support a plurality of magnetic pole sensors 14 closely adjacent to one end surface of the rotor 7.

In FIG. 29, the rotary shaft 8 is inserted into and integrated with a cylindrical yoke 70. The cylindrical yoke 70 carries on its outer peripheral surface a pair of arcuate permanent magnets 71 magnetized to have N-poles on their outer sides and S-poles on their inner sides and another pair of arcuate permanent magnets 72 magnetized to have S-poles on their outer sides and N-poles on their inner sides. The respective pairs of permanent magnets 71 and 72 are alternately arranged around the yoke 70 and bonded thereto.

In this brushless electromotor 1, the magnetic pole sensors 14 detect positions of the magnetic poles of the rotor 7 and, in response thereto, a control circuit (not shown) supplies the corresponding driving coils 6 with electric current so that an interaction of electric current and magnetic flux causes the rotor 7 to be rotated. As it has been rotated in this manner, the rotor 7 now presents new magnetic pole positions to be detected by the magnetic pole sensors 14 again, and the control circuit supplies the other driving coils 6 with electric current, causing the rotor 7 to be rotated again. Such operation is repeated and thereby the rotor 7 is continuously rotated. The rotary force thus generated is taken out as a motive power from the electric motor by way of the rotatable shaft 8.

FIG. 30 shows another rotor 7, in which the permanent magnets 71 and 72 are covered with a protective member 73 of nonmagnetic metal to prevent these permanent magnets 71 and 72 from flying off due to centrifugal force as the electromotor 1 is rotated at high speeds.

However, the maximum energy product and the residual flux density in the brushless electromotor utilizing the ferrite magnets are 3.3 MGOe and 2.8 KG, respectively, which are so low that it is necessary to increase the permeance of the magnetic circuit to develop a sufficient torque to drive the electromotor. As a result, it is necessary to use a large amount of magnets, making the electromotor disadvantageously bulky.

When the electromotor is used in the scroll type compressor or the like for high speed rotations, the permanent magnets can be destroyed or flying off because the stress generated by the centrifugal force becomes greater than the material strength of the permanent magnets and the adhesion of the magnets to the rotor.

Furthermore, covering the rotor with the protective member to avoid the flying-off of the permanent magnets not only complicates the manufacturing process of the rotor but also increases the gap between the rotor and the stator by the thickness of the protective member, and correspondingly increases the magnetic resistance. In a consequence, the magnet density decreases and the efficiency is significantly lowered.

The present invention has been developed to solve such problems as described above with respect to the conventional brushless electromotor.

Accordingly, it is an object of the invention to provide a compact rotor for use in the brushless electromotor, which can be manufactured efficiently and rotate at high speeds without the danger that the permanent magnets are destroyed or fly off during high speed rotations.

DESCRIPTION OF THE INVENTION

According to the invention there is provided a rotor having permanent magnets for use in a brushless electromotor, which includes a yoke formed from a plurality of silicon steel sheets laminated together and provided along its outer periphery with even number of, at least four magnetic poles, the magnetic poles being alternately provided at substantially equal distances from a rotary axis with slots to accommodate the respective permanent magnets so that the sides of the permanent magnets facing the rotary shaft have the same polarity.

With such arrangement, mutual repulsion of the diametrically opposed magnetic poles provides the rotor with magnetic poles twice the number of the permanent magnets.

The permanent magnets are inserted into the respective slots and held radially between the high-permeability materials so that flying-off of the permanent magnets due to high speed rotations is avoided. Thus, the need for the member covering the outer periphery of the rotor to prevent the permanent magnets from flying off is eliminated, minimizing the iron loss resulting from the use of such a covering member. The iron loss is further reduced by forming the yoke from the laminated steel sheets.

The permanent magnets according to the invention have a simple configuration and require no high precision in finishing the surface. This facilitates the manufacture of the permanent magnets.

DESCRIPTION OF THE PREFERRED EMBODIMENT

Initially, the first embodiment will be described in reference with FIGS. 1 through 4.

Figure 1:
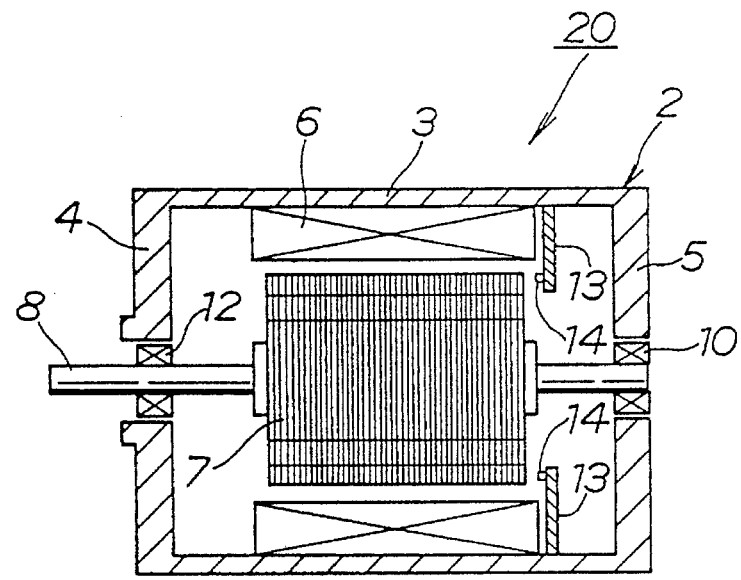
FIG. 1 is a vertical section of a brushless electromotor using a permanent magnet rotor according to the first embodiment of the invention.

In FIG. 1, the brushless electromotor 20 includes a motor casing (i.e. stator) 2 which consists of a cylindrical side wall 3, a front face plate 4, and a rear face plate 5. A plurality of driving coils 6 are arranged inside the side wall 3 to define a cylindrical array and fixed to the inner surface of the side wall 3. A rotary shaft 8 is fixed concentrically to the rotor 7. The rotary shaft 8 projects from opposite ends of the rotor 7 as to be rotatably supported at one end in a bearing 10 carried by the rear face plate 5 and at the other end in a bearing 12 carried by the front face plate 4 of the motor casing 2. An annular support member 13 is provided inside the side wall 3 to hold a plurality of magnetic pole sensors 14 such that these sensors 14 are positioned closely adjacent to one end surface of the rotor 7.

In this brushless electromotor 20, the magnetic pole sensors 14 detect positions of the magnetic poles of the rotor 7 and, in response thereto, a control circuit (not shown) supplies the corresponding driving coils 6 with electric current so that the interaction of electric current and magnetic flux causes the rotor 7 to be rotated. As it is rotated, the rotor 7 presents new magnetic pole positions to be detected by the magnetic pole sensors 14 again, and the control circuit supplies the other driving coils 6 with electric current, causing the rotor 7 to be rotated again. Such operation is repeated to continuously rotate the rotor 7. The rotary force thus generated is taken out as a motive power from the electromotor via the rotary shaft 8.

Figure 2:
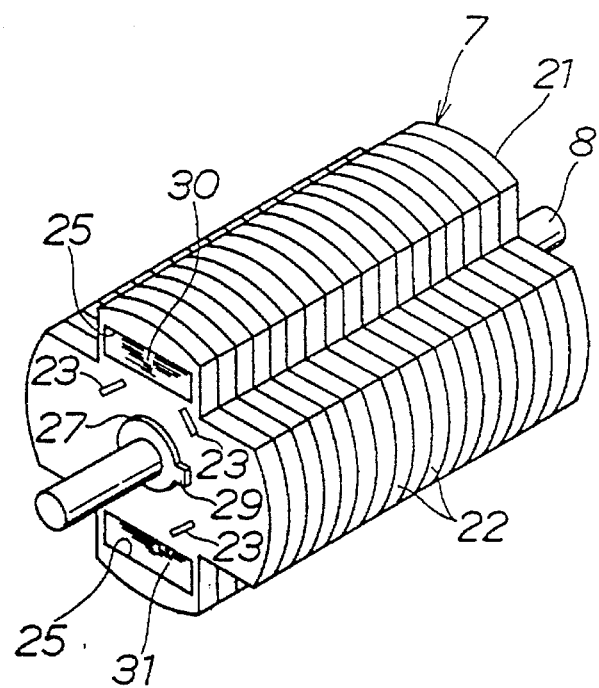
FIG. 2 is a perspective view of the permanent magnet rotor thereof.
Figure 3:
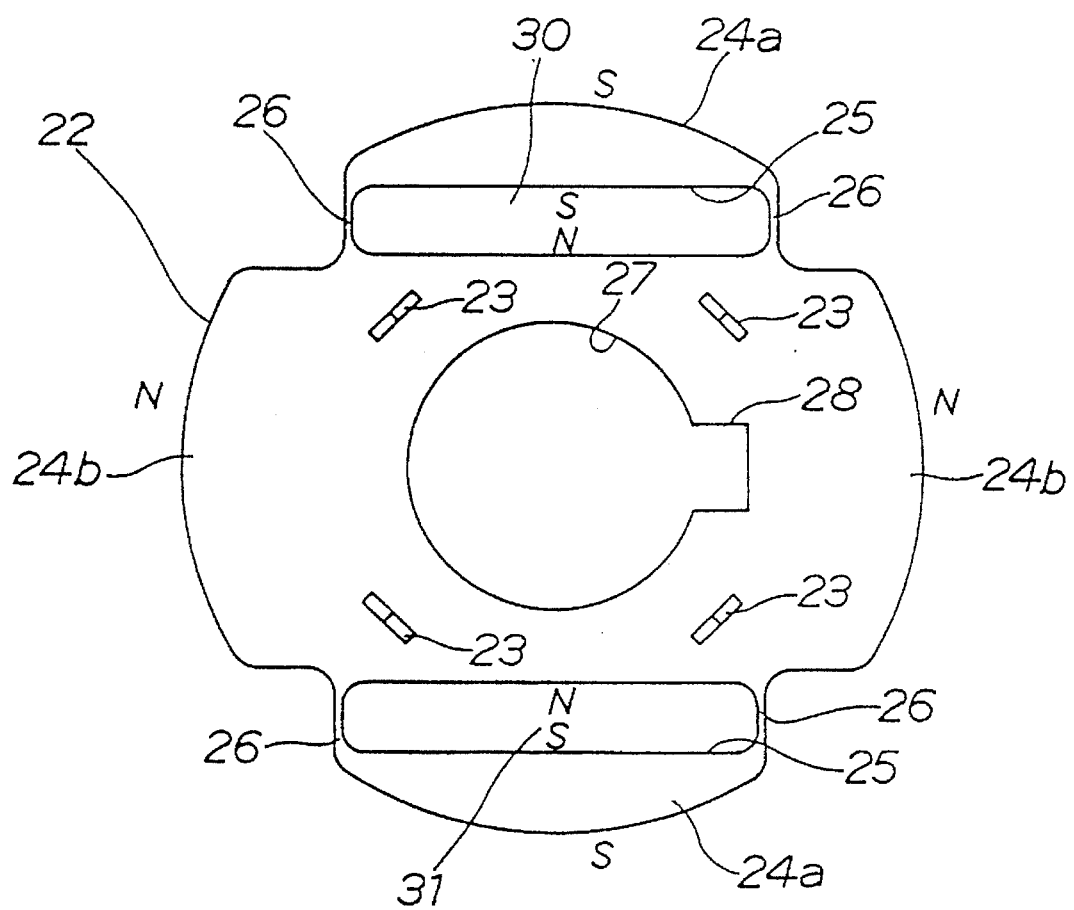
FIG. 3 is a front view of a silicon steel sheet of the permanent magnet rotor.

FIG. 2 shows the same rotor 7 as that incorporated in the brushless electromotor 20 of FIG. 1, and FIG. 3 shows a silicon steel sheet 22 constituting the rotor 7. A yoke 21 of the rotor 7 consists of a plurality of such silicon steel sheets 22 laminated one upon another in the axial direction of the rotary shaft 8 and integrally joined by pressed rectangular recesses 23 of the respective sheets 22 forcibly engaged with each other.

Each silicon steel sheet 22 made from a high permeability material has its surface coated with an inorganic insulating film and has a thickness of either 0.35 mm or 0.5 mm. As shown in FIG. 3, the silicon steel sheet 22 has four magnetic poles 24a and 24b radially extending to their arcuate outer ends and successively spaced from one another by an angle of 90°. A pair of diametrically opposed magnetic poles 24a are provided symmetrically to the rotational axis with corresponding pair of slots 25 to accommodate respective permanent magnets 30 and 31. Since the pair of magnetic poles 24a are provided with the pair of slots 25, respectively, the outer end portion and the root portion of each magnetic pole 24a are connected to each other by narrow bridges 26 defined on laterally opposite ends of each slot 25. Each silicon steel sheet 22 is centrally provided with an opening 27 to receive the rotary shaft 8, and this opening 27 is provided along part of its periphery with a keyway 28.

The rotary shaft 8 is diameter-enlarged along its longitudinally intermediate portion such that it snugly fits in the opening 27. After the silicon steel sheets 22 are integrally laminated to form the yoke 21, the rotary shaft 8 is inserted into the opening 27. The enlarged intermediate portion of the rotary shaft 8 is provided with a key 29 which engages the keyway 28 so that the rotor 7 cannot be rotated apart from the rotary shaft 8.

While the yoke 21 is composed of the silicon steel sheets 22, the silicon steel sheets 22 may be replaced by cold rolled steel sheets (SPCC) to form the yoke 21.

A pair of permanent magnets 30 and 31 are then inserted into the pair of slots 25 with their N-poles being diametrically opposed to each other. Consequently, the permanent magnets 30 and 31 are flanked in the radial direction by the high-permeability silicon steel sheets 22. Since the N-poles of these permanent magnets 30 and 31 are opposed to each other and repel each other, the magnetic poles 24a are S-polarized while the magnetic poles 24b are N-polarized, thus providing a 4-pole rotor.

Figure 4:
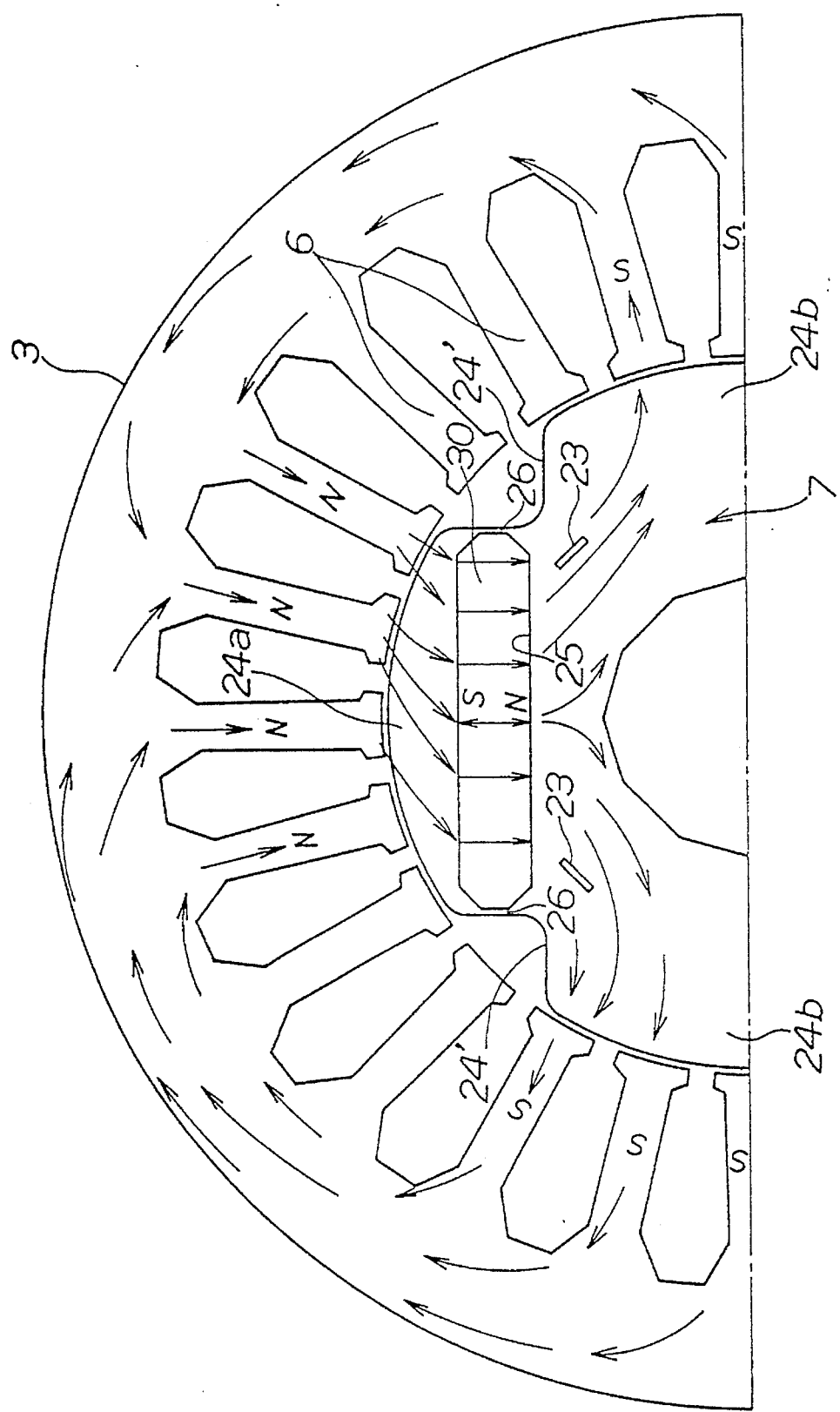
FIG. 4 is a schematic view showing lines of magnetic force generated in the permanent magnet rotor which is incorporated into the brushless electromotor.

FIG. 4 shows a pattern of magnetic force lines generated by the rotor 7 incorporated into the electromotor. As shown, the lines of magnetic force exiting from the N-pole of the permanent magnet 30 pass through the bridges 26 toward the S-pole. The bridges 26 are made so narrow that the magnetic flux density therein is readily saturated. A notch 24' is provided between the S-pole 24a and the N-pole 24b so that the lines of magnetic force run from the pole-face of the magnetic pole 24b through the inside of the driving coils 6 to the pole-face of the magnetic pole 24b to the S-pole under the mutual repulsion of the diametrically opposed same poles of the permanent magnets 30 and 31. The pressed portions 23 are rectangular and their longer sides are angled by 45° with respect to a direction in which the magnetism of the rotor 7 is oriented so as not to interfere with the lines of magnetic force.

According to this embodiment, each silicon steel sheet is provided with a plurality of magnetic poles radially extending outwardly from the outer periphery of the sheet and these magnetic poles are alternately provided with slots to accommodate the respective permanent magnets so that the sides of these permanent magnets facing the rotary shaft may have the same polarity. With such arrangement, mutual repulsion of the diametrically opposed magnetic poles provides the rotor with magnetic poles twice the number of permanent magnets.

In addition, the permanent magnets are inserted into the respective slots and radially held in the highly permeable material so that accidental flying-off of the permanent magnets due to high speed rotations is avoided. Accordingly, the need for the member for covering the outer periphery of the rotor so as to prevent the permanent magnets from flying off is eliminated, and the iron loss due to the use of such a member can be eliminated. The iron loss can be further reduced by making the yoke from the laminated steel sheets.

Moreover, the permanent magnet according to this embodiment has a simple configuration and requires no high precision in finishing the surface, facilitating the manufacture of the permanent magnet.

The second embodiment of the invention will be described in reference with FIG. 5.

Figure 5:
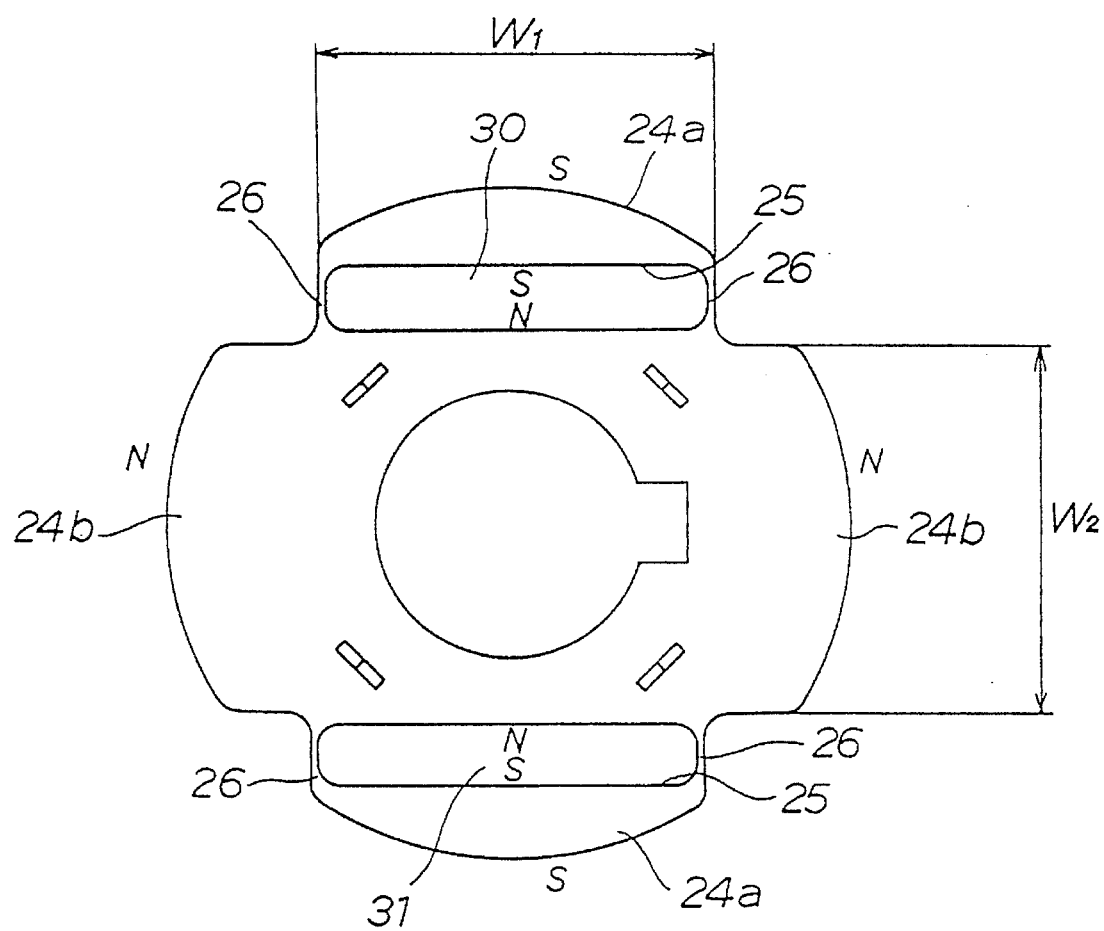
FIG. 5 is a front view of a permanent magnet rotor in which the magnetic poles have different widths according to the second embodiment of the invention.

In FIG. 5, the lines of magnetic force exiting from the N-pole of the permanent magnet 30 partially return to the S-pole without passing through the pole-face of the magnetic pole 24b due to a so-called magnetic flux leakage and, therefore, the total amount of magnetic flux on the pole-face of the magnetic pole 24a will exceed that of the magnetic pole 24b if the pole-face of the magnetic pole 24a has a width W1 equal to a width W2 of the magnetic pole 24b. In view of this, the width W2 is made larger than W1 in the instant embodiment so that the total amounts of magnetic flux on the pole faces of the magnetic poles 24a and 24b are equalized thereby making the generated torque uniform.

The third embodiment will be described with reference to FIGS. 6 and 7.

Figure 6:
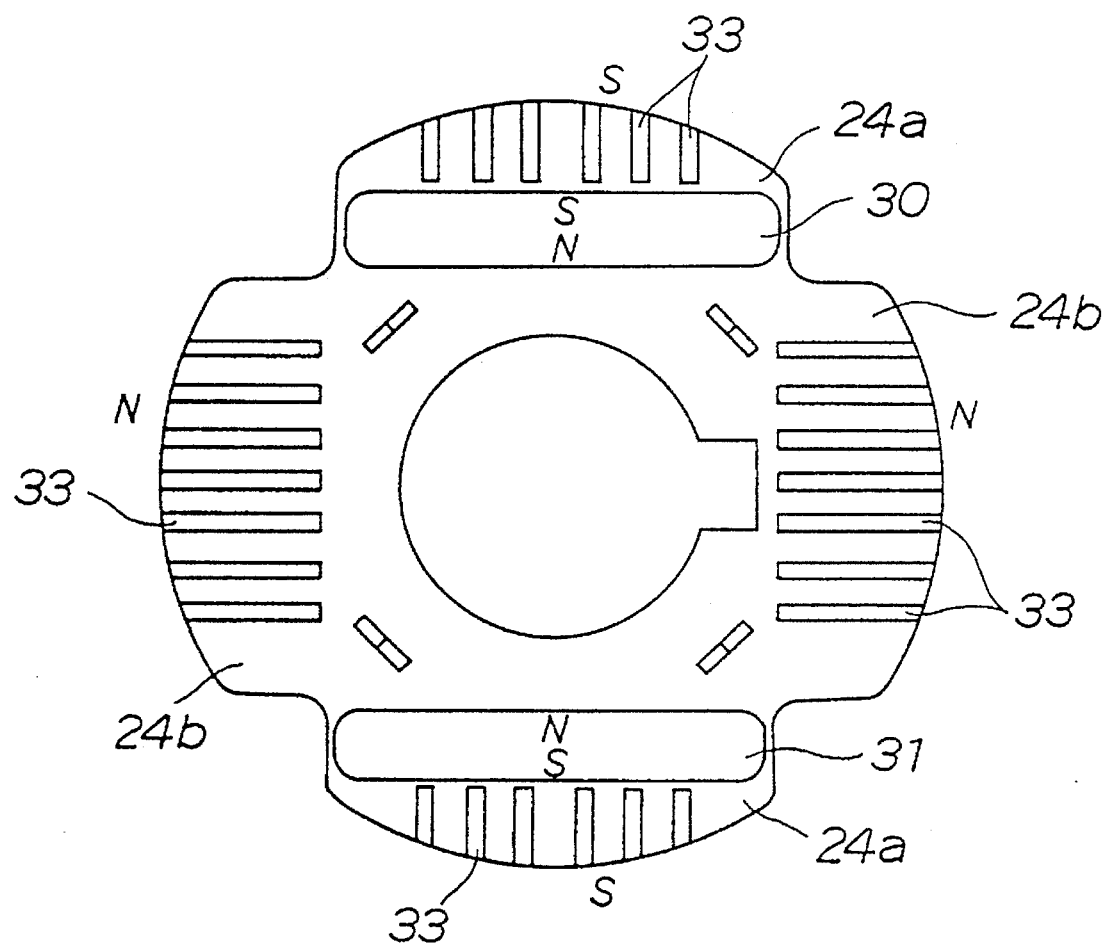
FIG. 6 is a front view of a permanent magnet rotor in which each magnetic pole is provided with a plurality of slits according to the third embodiment of the invention.

In FIG. 6, the magnetic poles 24a and 24b are provided with slits 33 oriented in conformity with directions of magnetism presented by the respective magnetic poles 24a and 24b. Generally, the lines of magnetic force exiting from the N-pole reach the S-pole along the shortest paths and accordingly the magnetic flux density at opposite ends is higher than that of the middle portion on the pole-face of the magnetic pole 24a, as compared with that of the embodiment of FIG. 4. To overcome such undesirable tendency, the magnetic pole in the instant embodiment is provided with the slits 33 so that the lines of magnetic force are forcibly guided to exit from or enter into the pole-face along the slits 33.

Figure 7:
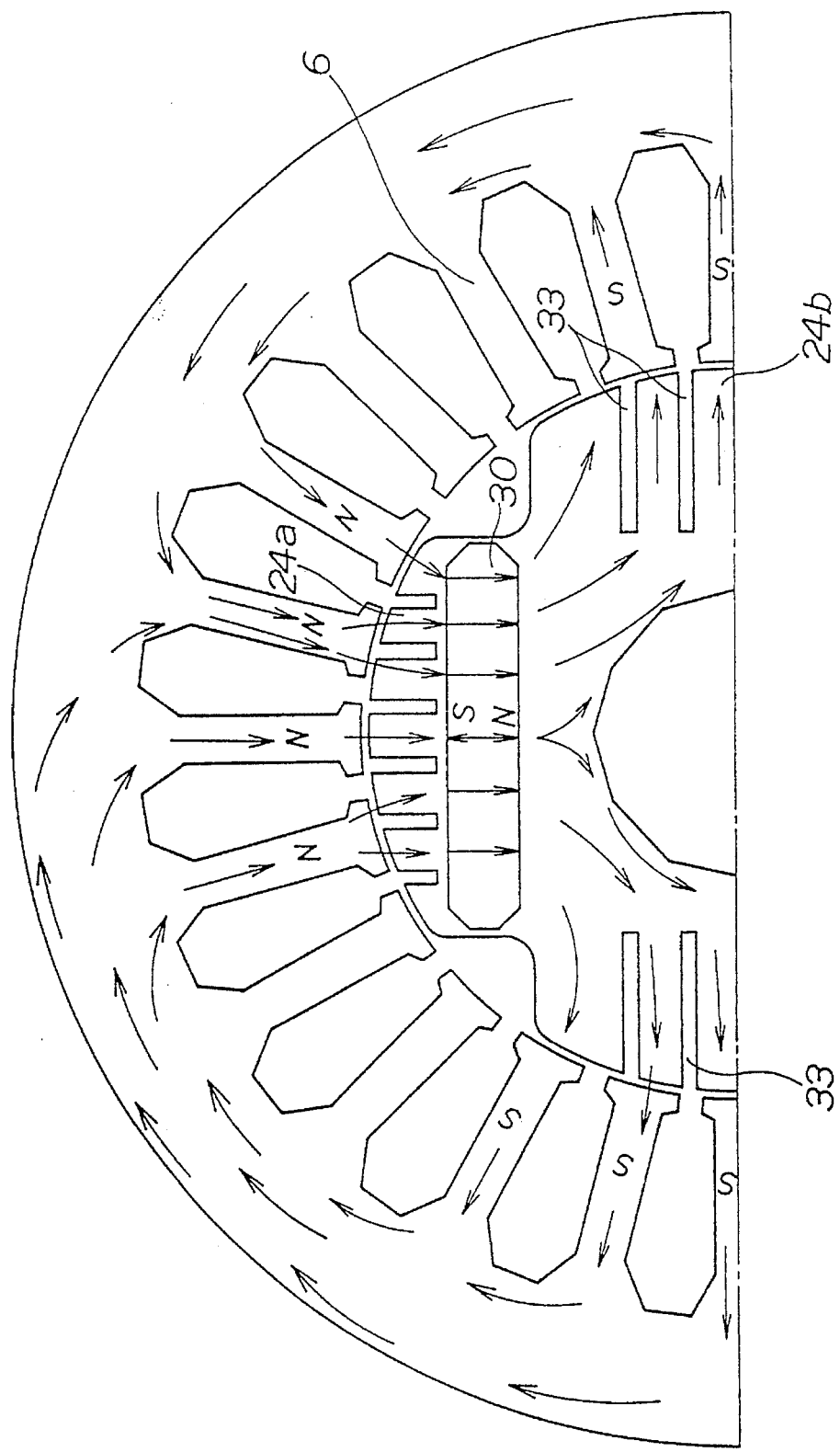
FIG. 7 is a schematic view of lines of magnetic force generated in the permanent magnet rotor with the slits which is incorporated in the brushless electromotor.

FIG. 7 shows a pattern of the lines of magnetic force in this embodiment. As shown, the lines of magnetic force exiting from the N-pole of the permanent magnet 30 are guided by the slits 33 of the magnetic pole 24b prior to passing through the driving coils 6, then guided by the slits 33 of the magnetic pole 24a and return to the S-pole of the permanent magnet 30. Thus, the lines of magnetic force are distributed uniformly by the slits 33 on the same pole-face, thus making the generated torque uniform. In this way, not only the thermal distribution in the permanent magnet rotor is improved but also the cooling area is increased.

The fourth embodiment of the invention will be described with reference to FIG. 8.

Figure 8:
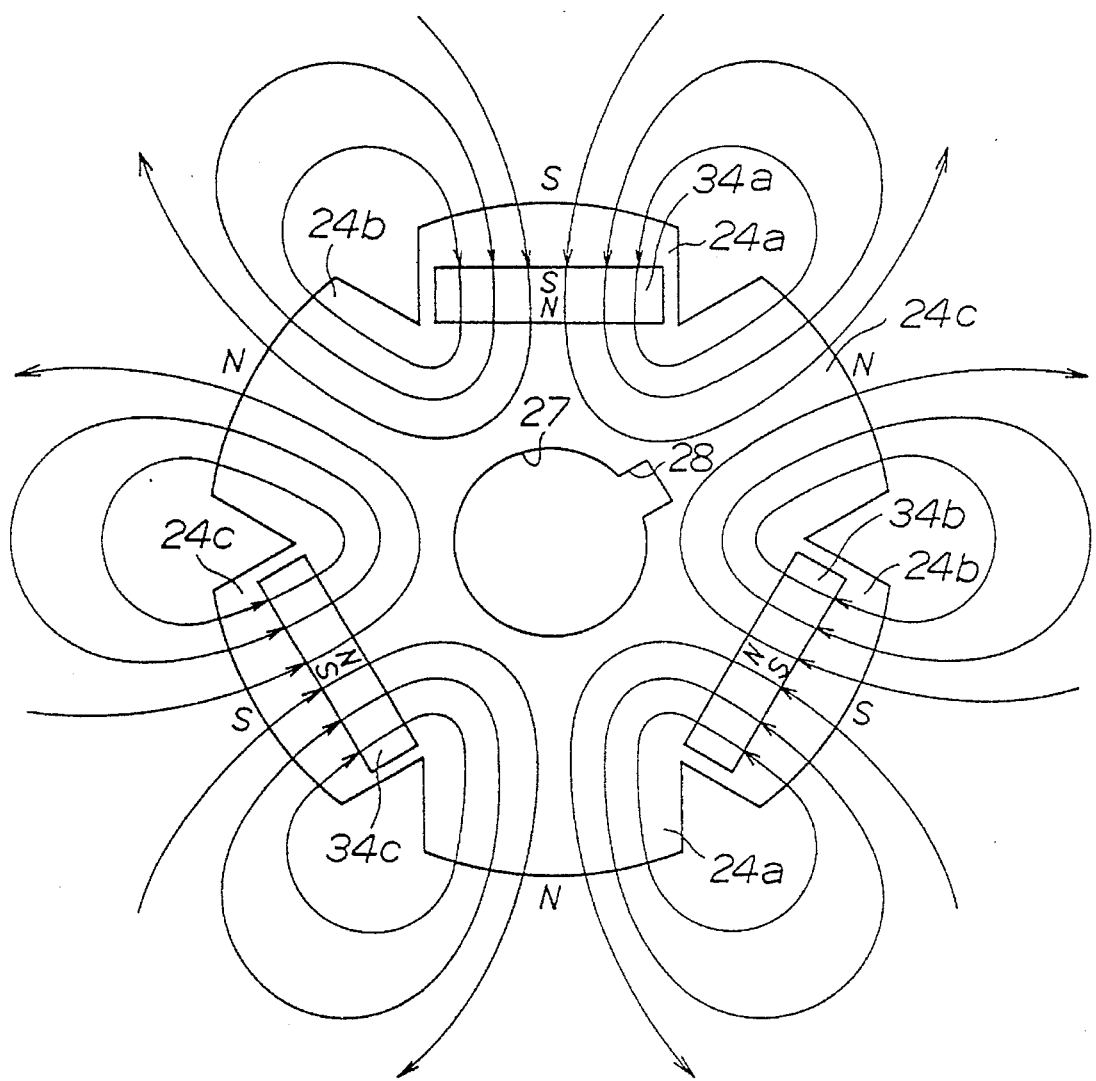
FIG. 8 is a front view of a permanent magnet rotor having six magnetic poles according to the fourth embodiment according to the fourth embodiment of the invention.

FIG. 8 shows, in section, a 6-pole rotor 7. The respective magnetic poles 24a, 24b, and 24c radially extending outwardly and angularly spaced from each other by 60°. These magnetic poles are alternately provided with permanent magnets 34a, 34b, and 34c inserted thereinto so that the N-poles of these magnets face inwardly. The yoke 21 is centrally provided with the opening 27 to accommodate the rotary shaft and the opening 27 is provided with the keyway 28 to prevent the rotary shaft from being rotated with respect to the rotor.

The respective permanent magnets 34a, 34b, and 34c are arranged with their N-poles facing inwardly in this embodiment and, therefore, the lines of magnetic force exiting from the respective N-poles are repelled by the N-poles of the other permanent magnets and enter through the adjacent pole-faces into the respective S-poles. In this manner, the magnetic poles containing the associated permanent magnets are S-polarized while the magnetic poles containing no permanent magnet are N-polarized.

While this embodiment employs the permanent magnets made of cast praseodymium (Pr) alloy, it is possible to employ the permanent magnets made of any type selected from the group consisting of cast type (e.g. alnico or praseodymium magnet), sintered type (e.g. ferrite or rare earth magnet), and resin bound type (e.g. ferrite or rear earth magnet).

The permanent magnets are made in the form of a rolled plate having a rectangular cross-section and a length in the axial direction two to five times the width in the circumferential direction of the rotor. The rectangular cross-section facilitates manufacturing process of the permanent magnets in comparison with the conventional arcuate ones. In addition, since the permanent magnets according to the invention are not bonded to the outer peripheral surface of the yoke, there is no need for precision surface finishing, Moreover, the permanent magnets of the invention never fly off under the influence of high speed rotations because they are fitted in the associated slots 25 and held radially between the highly permeable materials. Thus, the rotor according to the invention is useful for the high speed electromotor.

The silicon steel sheets 22 of the yoke 21 are formed by a press and thereby not only a high productivity is achieved but also the rotor of an accurate outer dimension can be obtained, thus allowing an efficient electromotor to be realized.

The fifth embodiment of the invention will be described, in which the bridges 26 are provided with grooves to limit passage of the magnetic flux.

Figure 9:
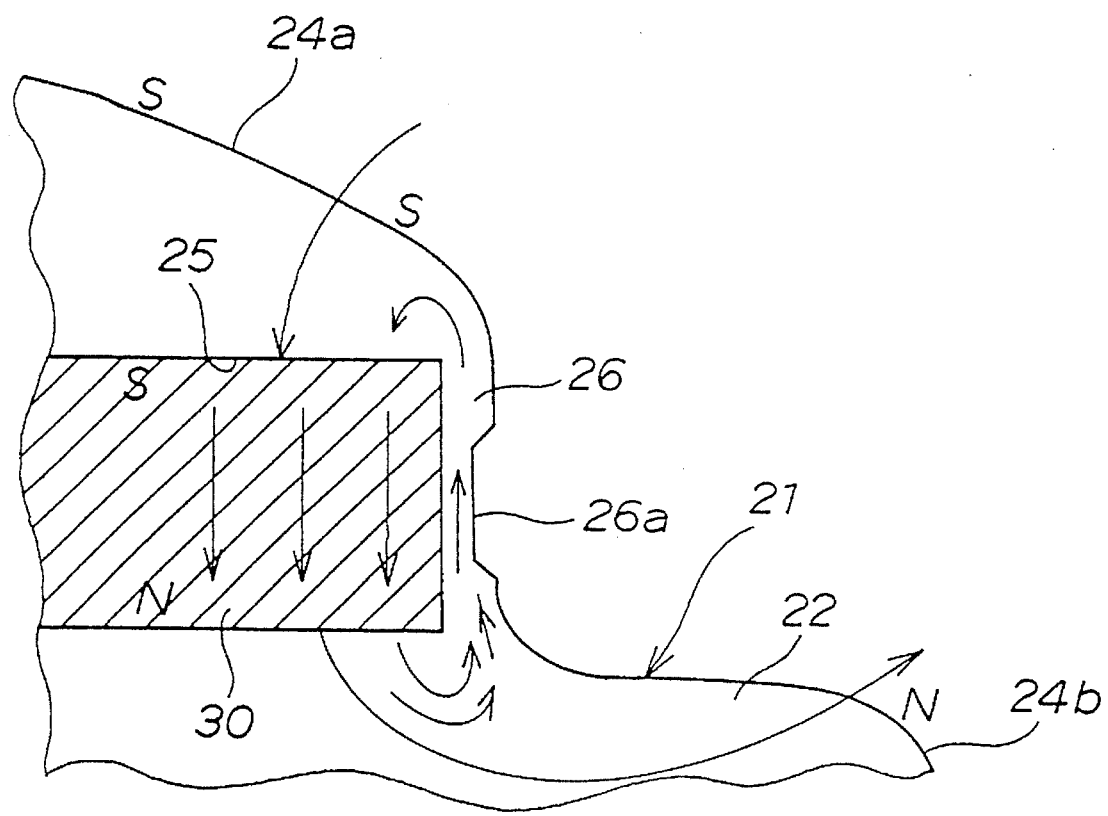
FIG. 9 is a sectional view showing, in an enlarged scale, a bridge formed in a permanent magnet rotor according to the fifth embodiment of the invention.

In FIG. 9, which shows part of the magnetic pole 24a in an enlarged scale, a part of the magnetic flux exiting from the N-pole of the permanent magnet 30 passes through the bridge 26 to the S-pole of the permanent magnet 30 as shown in the figure. This part of magnetic flux passing through the bridge 26 never passes through the space external to the yoke 21 and, therefore, never intersects the stator of the electromotor. Consequently, no force for rotational driving of the rotor is generated. By minimizing the amount of magnetic flux passing through the bridge 26, the magnetic force of the permanent magnet 30 can be utilized with higher efficiency.

The part of magnetic flux $\phi$ passing through the bridge 26 can be calculated according to the following equation:

$$\phi = B \times S$$

where S is the sectional area of the bridge 26 and B is the magnetic flux density in the silicon steel sheet 22.

It is obvious from this equation that the sectional area S of the bridge 26 may be reduced to minimize the amount of magnetic flux passing through the bridge 26.

In this embodiment, each bridge 26 is provided with a flux limiting groove 26a. Formation of such groove 26a correspondingly reduces the sectional area of the bridge 26 and thereby limits the amount of magnetic flux passing through this bridge 26.

Provision of the above-mentioned flux limiting grooves 26a in the respective bridges 26 allows the amount of magnetic flux passing through the bridges 26 to be effectively limited so that the magnetic force of the permanent magnets can be efficiently utilized and thus the permanent magnet rotor of a higher efficiency can be obtained.

Formation of the flux limiting grooves 26a is performed by successive steps of stamping out the individual silicon steel sheets 22, laminating them to form the yoke 21 and finally providing the yoke 21 by use of suitable tools such as a grinder with the desired grooves 26a. The manufacturing process of the grooves 26a is easier than the stamping of the silicon steel sheets 22 so far as the dimensional accuracy is concerned, and therefore, it is possible to provide the respective bridges 26 with minimized sectional area, respectively, without difficulty. Accordingly, the permanent magnet rotor of the invention is advantageous in comparison with the conventional permanent magnet rotor having no grooves formed in the respective bridges because of the facilitated production and the bridges having the significantly reduced sectional areas both achieved by the present invention.

The sixth embodiment of the invention will be described, in which each of the bridges 26 is provided only on the front side of the associated slot 25 as viewed in the direction of rotation.

Figure 10:
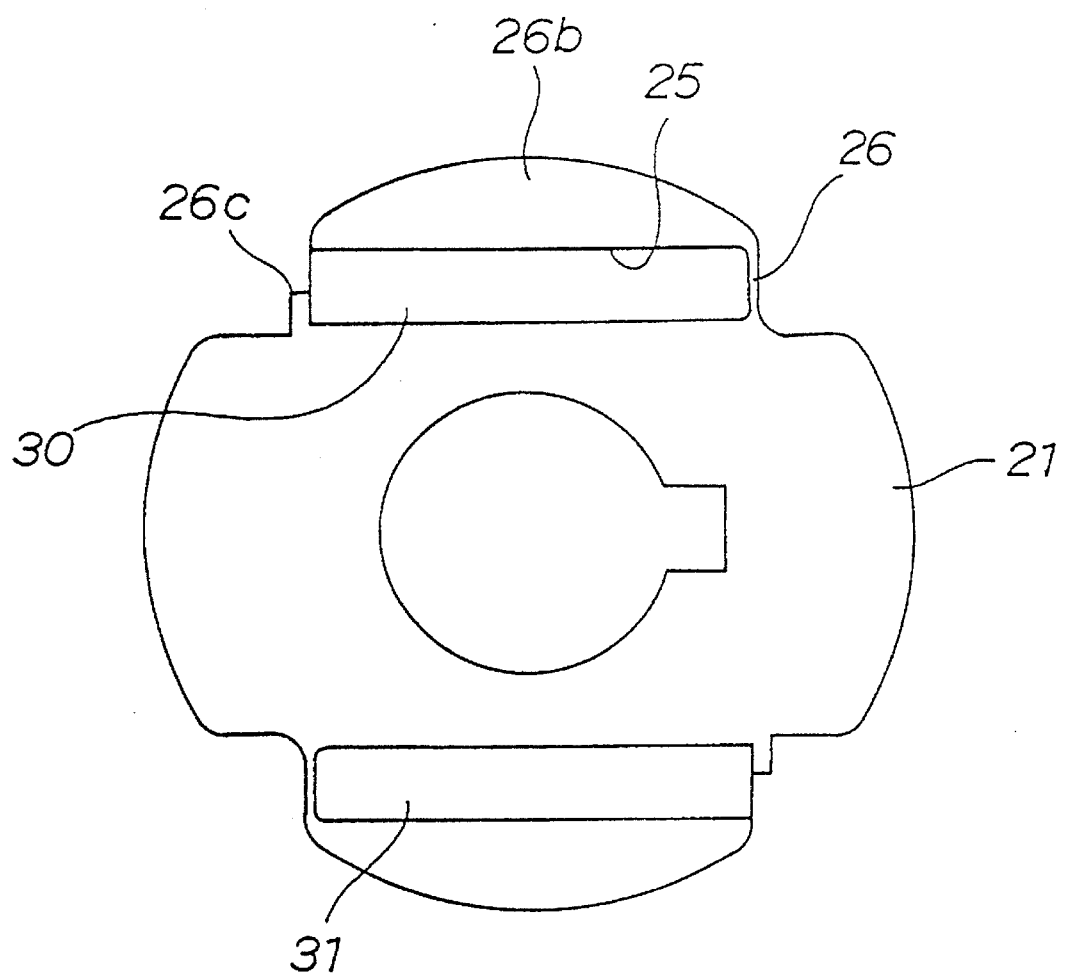
FIG. 10 is a plan view of a silicon steel sheet according to the sixth embodiment of the invention.

In FIG. 10, the respective slots 25 are of the respective slots 25 are of half-closed type. More specifically, the bridges 26 connecting the respective magnetic pole pieces 26b to roots of the respective magnetic poles are of the cantilever type and configured point-symmetrically with respect to the rotational axis so as to have the respective bridges 26 on the front sides but no bridges on the rear sides in the rotational direction.

The permanent magnets 30 and 31 are inserted in the axial direction into the respective slots 25 of the yoke 21 made from the laminated silicon steel sheets. The silicon steel sheets are provided on the sides having no bridges with stoppers 26c to prevent the respective permanent magnets 30 and 31 from flying off from the slots during high speed rotations.

Figure 11:
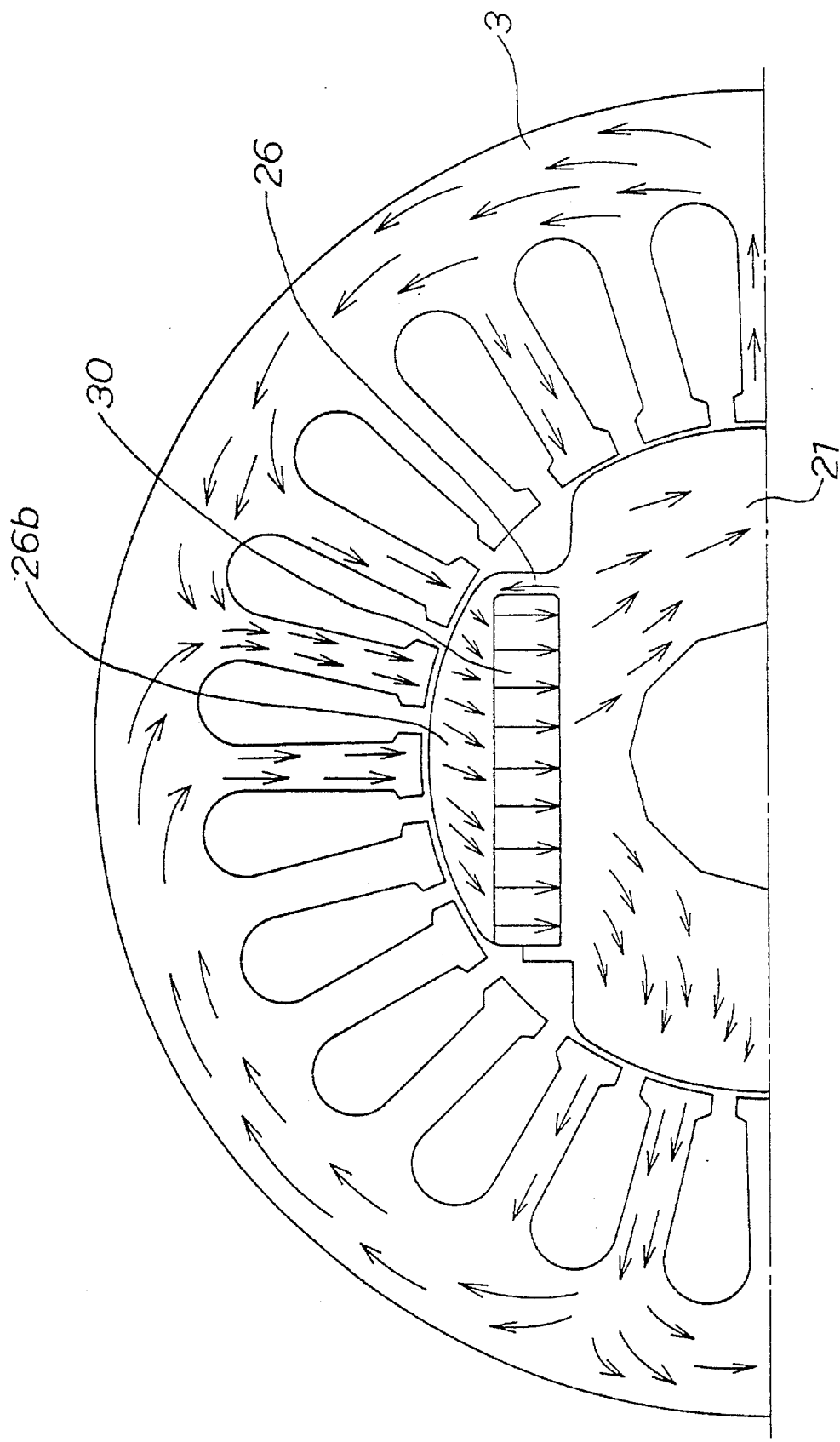
FIG. 11 is a magnetic field analysis diagram showing a pattern of lines of magnetic flux under a load torque.

FIG. 11 shows a pattern of magnetic flux produced under a load torque on the basis of field analysis. A width of the bridge 26 corresponds to a width of leakage flux and a thickness of the permanent magnet 30 corresponds to a thickness of the leakage flux occurring at opposite ends.

In this manner, as shown in FIG. 11, the leakage flux flows through the bridge 26 and the flux is saturated in the bridge as well as in the porion of the magnetic pole piece extending adjacent to the bridge. Consequently, even under the load current, the magnetic flux exiting from the permanent magnets 30 and 31 is not readily deflected by the magnetic pole piece 26b and, accordingly, the circumferential center of the magnetic pole is not readily moved under the load. Such condition is convenient for introduction of so-called sensorless technique. The left half portion of each magnetic pole piece with respect to the center thereof generates a larger amount of magnetic flux, since no leakage flux occurs on the side having no bridge, and, as a result, the leakage flux occurring along the bridge will not significantly reduce the total amount of magnetic flux.

The seventh embodiment of the invention will be described. In this embodiment, laterally opposite ends 30a and 31a of the respective permanent magnets 30 and 31 facing the bridge 26 as well as axially opposite ends 30b and 31b of these permanent magnets are covered with a nonmagnetic material.

Figure 12:
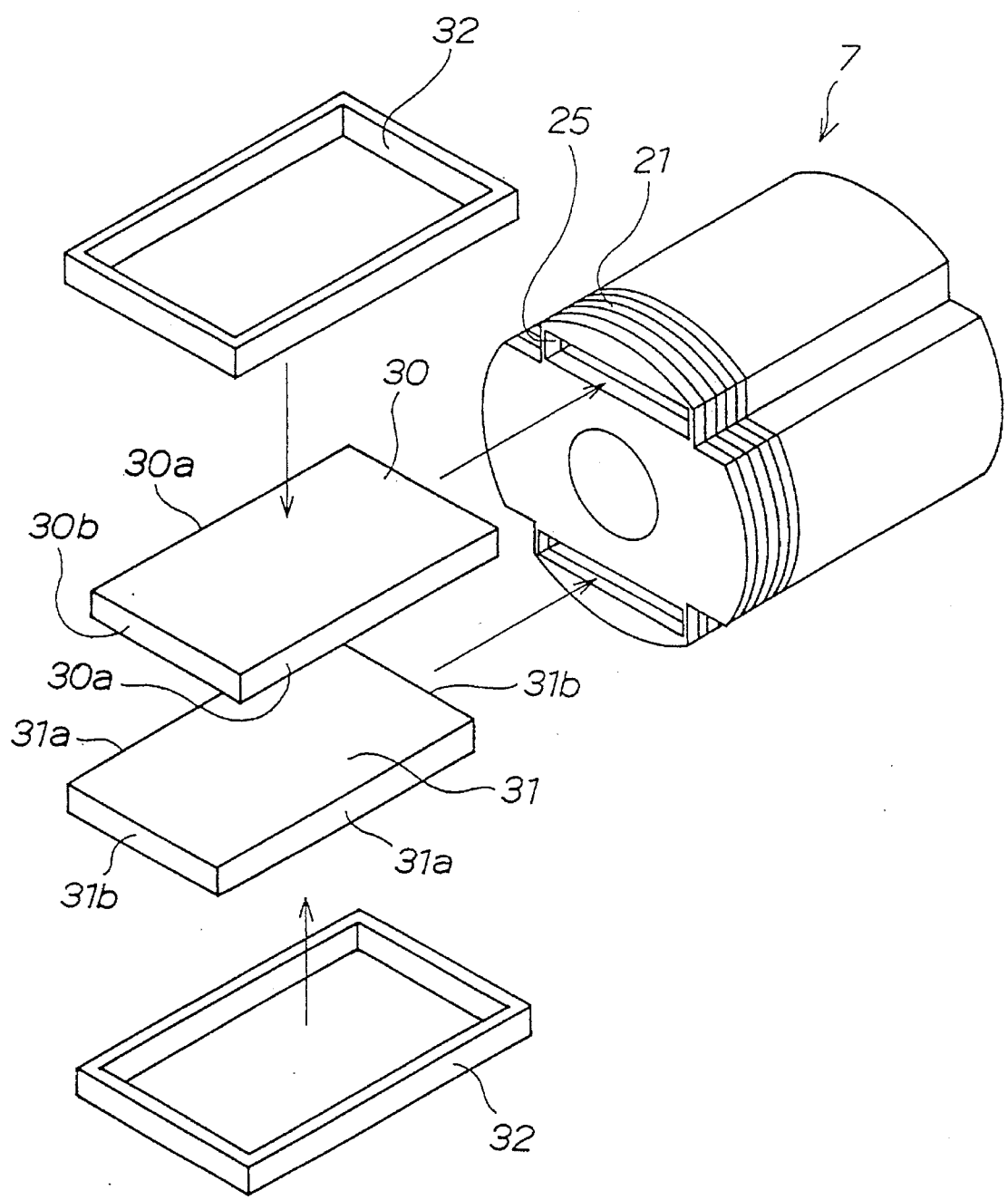
FIG. 12 is an exploded perspective view of a permanent magnet rotor according to the seventh embodiment of the invention.

In FIG. 12, there are provided spacers 32 made of aluminum or nonmagnetic stainless in the form of a frame to cover the laterally opposite ends and the axially opposite ends of the respective permanent magnets 30 and 31. Each frame is dimensioned so as to accommodate the associated magnet snugly and has a height slightly less than a thickness of the magnet so that the magnet is not protruded over the frame too much.

Figure 13:
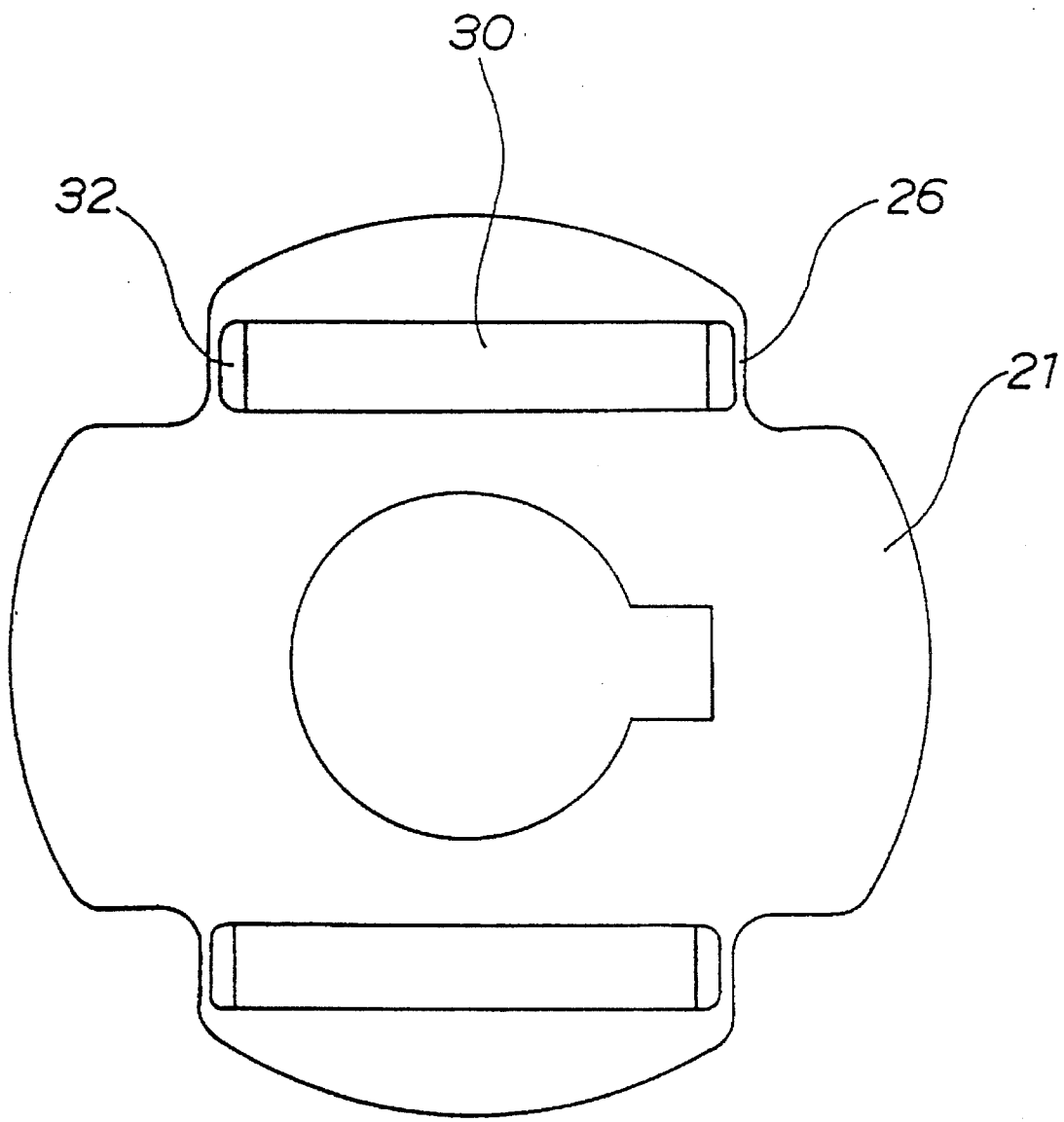
FIG. 13 is a sectional view of the rotor of FIG. 12 as assembled.

Assembling is performed by inserting the permanent magnets 30 and 31 into the associated spacers 32 in the magnetizing direction followed by inserting the respective subassemblies into the slots 25 of the yoke 21, to obtain a configuration shown in the sectional view of FIG. 13.

Figure 14:
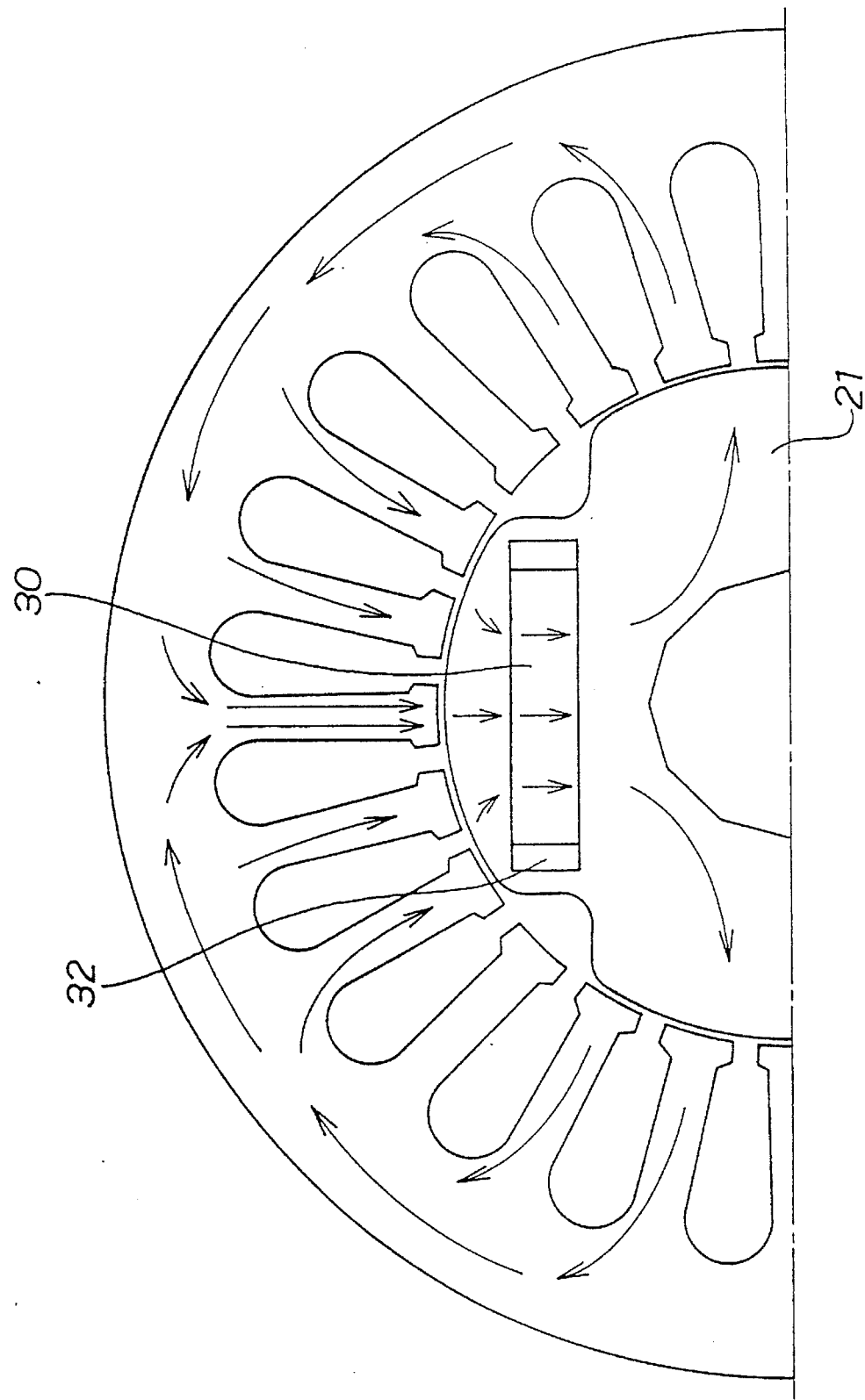
FIG. 14 is a diagram showing lines of magnetic flux observed after the components are assembled to define a magnetic circuit.

FIG. 14 shows a flow of magnetic flux observed after the assembly is incorporated into the magnetic circuit. The nonmagnetic spacers 32 provided on the laterally opposite ends of the permanent magnet 30 serves to obstruct a flow of magnetic flux and thereby to assure that the magnetic flux exits from the magnet substantially without leakage. In this manner, the leakage flux can be reduced and the effective gap flux can be maintained.

Additionally, the height of each spacer is dimensioned to be slightly larger than the thickness of the permanent magnet accommodated therein and this dimensioning is advantageous in that, when the magnet is inserted together with the associated spacer into the slot of the yoke, the magnet is never in contact with the slot of the yoke. As a result, a fear that the magnet surface might be damaged and rusted can be eliminated.

the eighth embodiment of the invention will be described.

Figure 16:
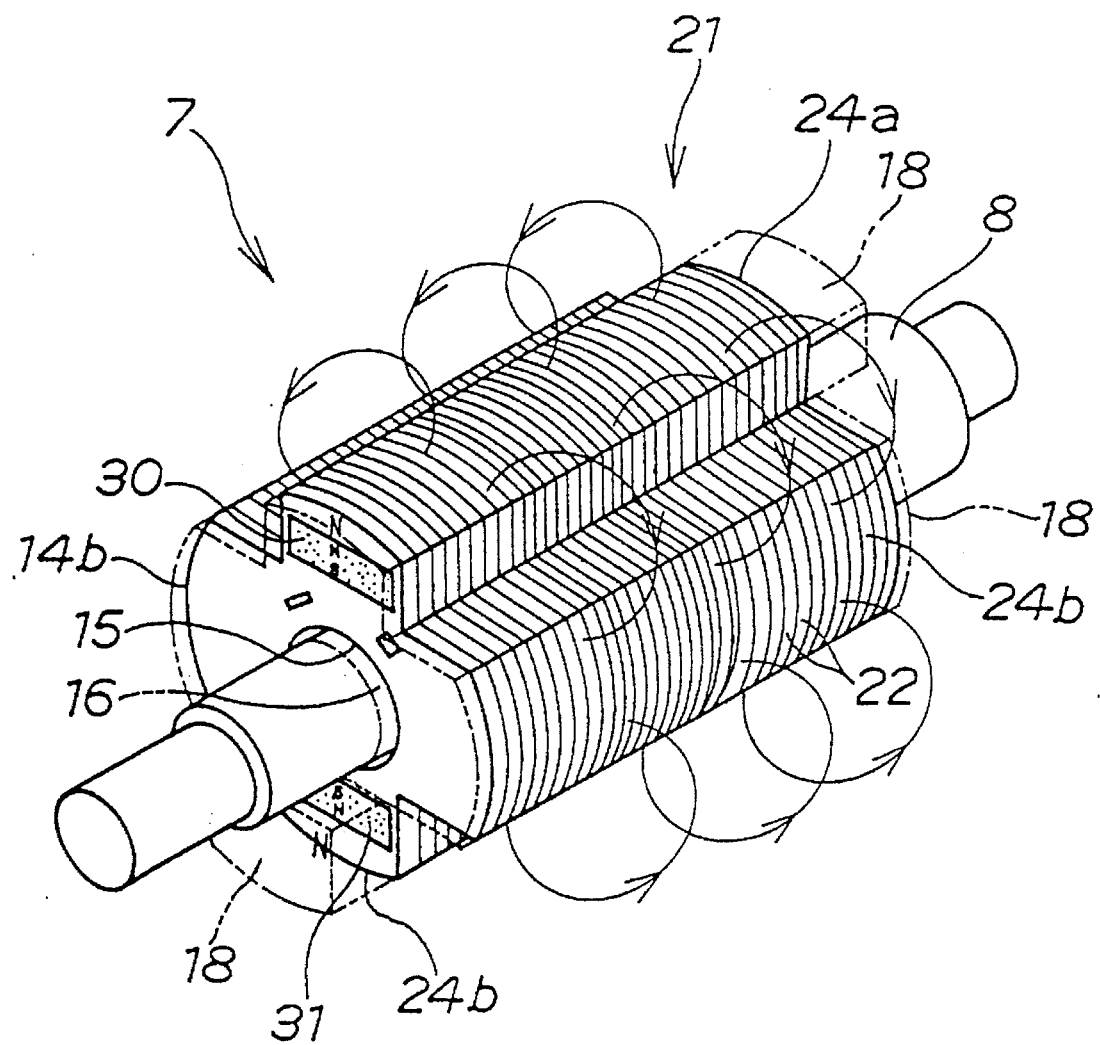
FIG. 16 is a perspective view of a permanent magnet rotor according to the eighth embodiment of the invention.
Figure 17:
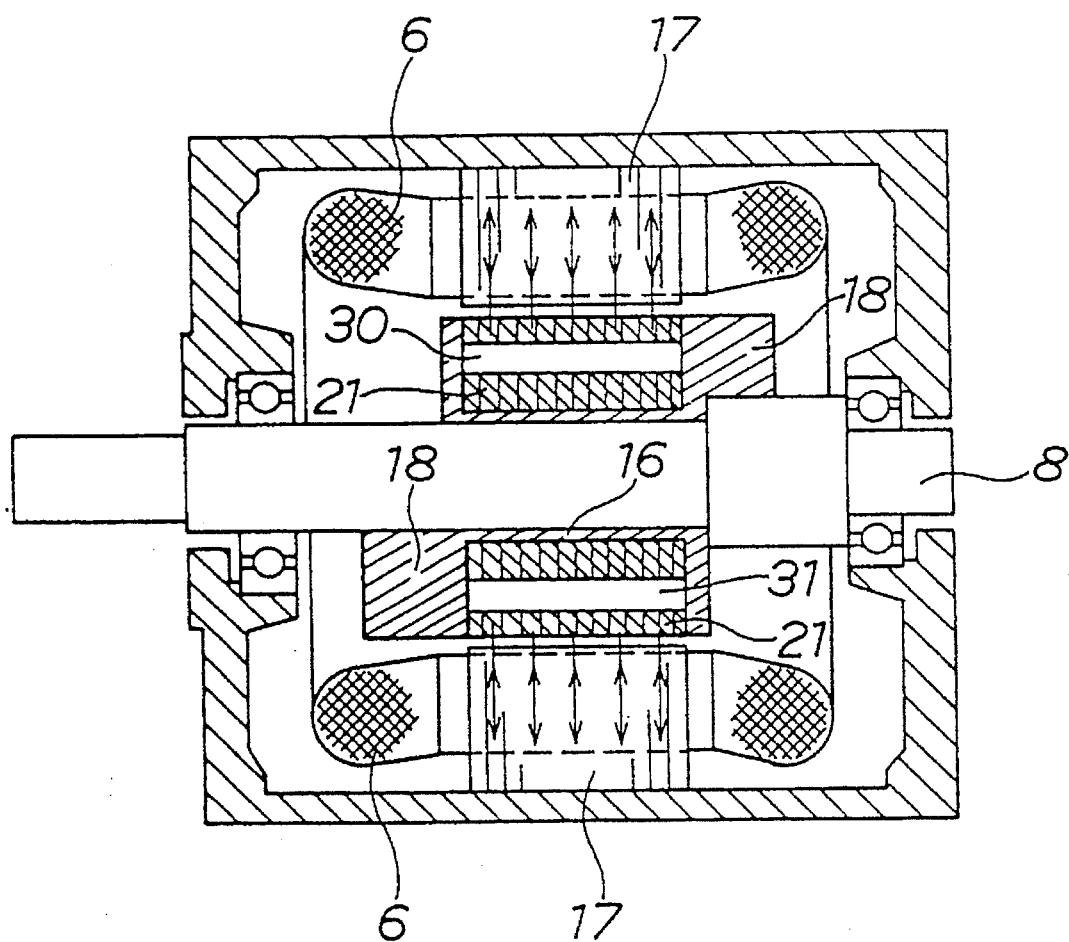
FIG. 17 is a sectional view, taken along the axis, of a brushless electromotor utilizing the permanent magnet rotor according to the eighth embodiment.

In FIG. 16, this embodiment is characterized by an arrangement such that the yoke 21 has an opening 15 axially extending therethrough to receive the rotary shaft 8. The opening 15 has a diameter larger than the outer diameter of the rotary shaft 8. The rotary shaft 8 is received by the opening 15 substantially in concentric relationship with a flux-leakage-proof member 16 interposed between the outer peripheral surface of the rotary shaft 8 and the inner wall of the opening 15 so that the yoke 21 is integrally bonded to the rotary shaft 8 with interposition of this flux-leakage-proof member 16.

Figure 15:
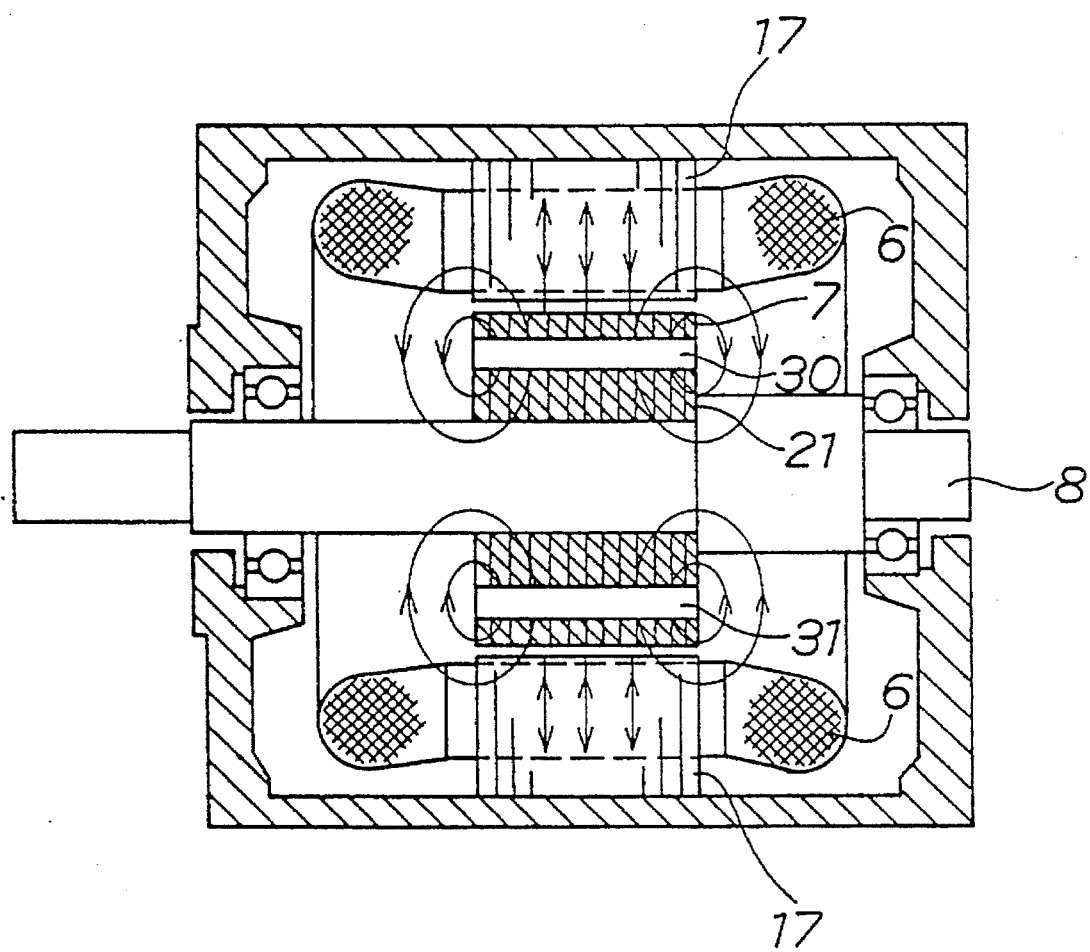
FIG. 15 is a sectional view, taken along the axis, of a brushless electromotor utilizing the permanent magnet rotor according to the first embodiment.

More specifically, as shown in FIG. 15, the magnetic flux developed in the rotor 7 of the brushless electromotor as recited in claim 1 passes through the space external to the rotor 7 under the inter-pole repulsion effect of the permanent magnets 30 and 31, and then intersects a stator core 17. Magnetic poles of this stator core 17 generates a magnetic field to be rotated under the effect of current flowing through the driving coils 6. The permanent magnet rotor 7 is rotationally driven by the rotating field generated by the magnetic poles of the stator core 17.

The permanent magnet rotor 7 has the opening centrally extending through the yoke 21 and having the inner diameter substantially corresponding to the outer diameter of the rotatable shaft 8 to receive the rotary shaft 8. to assemble the permanent magnet rotor 7, the yoke 21 is heated so as to thermally expand the opening 15 and the rotary shaft 8 is forced thereinto. Then, the yoke 21 is cooled to bring the inner wall of the opening to close contact with the outer peripheral surface of the rotary shaft 8 and thereby to bond the rotary shaft 8 integrally to the yoke 21.

In assembling the permanent magnet rotor having balance weights on axially opposite end surfaces of the yoke 21, these balance weights are manufactured in a separate process and thereafter the rotatable shaft is forced into the opening extending through the balance weights and the yoke.

With the previously mentioned embodiment of permanent magnet for brushless electromotor, there is a fear that the magnetic flux partially passes through the inside of the rotary shaft and then leak externally of the axially opposite end surfaces of the permanent magnet rotor. Partial leakage of the magnetic flux will prevent the magnetic flux from intersecting the stator core and, in consequence, the magnetic force of the permanent magnets do not effectively contribute to rotation of the electromotor, resulting in the reduced efficiency of the brushless electromotor.

Accordingly, it is an object of this eighth embodiment to provide a permanent magnet rotor for brushless electromotor so improved that the flux leakage otherwise often occurring outwardly from the axially opposite end surfaces of the rotor is substantially avoided and manufacturing the permanent magnet rotor is facilitated.

As shown in FIG. 16, the permanent magnet rotor 7 includes the central opening 15 axially extending therethrough to receive the rotary shaft 8, the flux-leakage-proof member 16 made of aluminum die cast material between the yoke 21 and the rotary shaft 8, and the balance weights 18 made of aluminum die cast material on the axially opposite end surfaces of the yoke 21. The aluminum die cast material has a flux shielding property by which the magnetic flux is prevented from passing through both the member 16 and the balance weights 18. Consequently, the magnetic flux passing through the rotary shaft 8 toward the axially opposite ends is shielded by the flux-leakage-proof member 16 and the balance weights 18 and cannot exit outwardly from the axially opposite end surfaces of the yoke 21.

When such permanent magnet rotor 7 is used for the brushless electromotor, all the magnetic flux lines pass through on the faces perpendicular to the rotary shaft 8 and effectively intersect the stator core 17. Upon current supply to the driving coils 6, a rotating field is generated in the magnetic poles of the stator core 17 so that the permanent magnet rotor is rotationally driven by interaction between the rotating field generated in the stator core and the magnetic flux in the permanent magnet rotor. Accordingly, the greater the amount of magnetic flux intersecting the stator core is, the larger the torque is. With this specific embodiment of permanent magnet rotor 7, the magnetic flux thereof can be effectively converted to the rotating force, since all the magnetic flux generated by the permanent magnets 30 and 31 intersects the stator core 17 without exiting externally from the axially opposite end surfaces of the yoke 21.

Furthermore, this embodiment of permanent magnet rotor 7 includes the rotary shaft 8 loosely inserted into the opening 15 axially extending therethrough, the flux-leakage-proof member 16 and the balance weights 18, wherein the components 16 and 18 are integrally molded from aluminum die cast material. Such unique arrangement advantageously makes it possible to eliminate not only a separate process of manufacturing the balance weights but also a process of assembling these balance weights together with the yoke into the permanent magnet rotor, and thereby facilitates manufacturing of the permanent magnet rotor 7.

Although this embodiment has been described as including the balance weights, even when the permanent magnet rotor is provided only with the flux-leakage-proof member, the magnetic flux is effectively prevented from passing through the rotating shaft so as to improve the efficiency of the electromotor.

Moreover, the flux-leakage-proof member is not limited to that made of aluminum die cast material, and a similar effect can be achieved even when the member is made of the other material having a lower magnetic permeability, such as resin.

The ninth embodiment will be described. This embodiment is characterized by a unique arrangement that the inner peripheral surface of the yoke 21 defining the slot 25 is provided with projections for engagement with the associated permanent magnet 30 and 31 forced into this slot.

Figure 18:
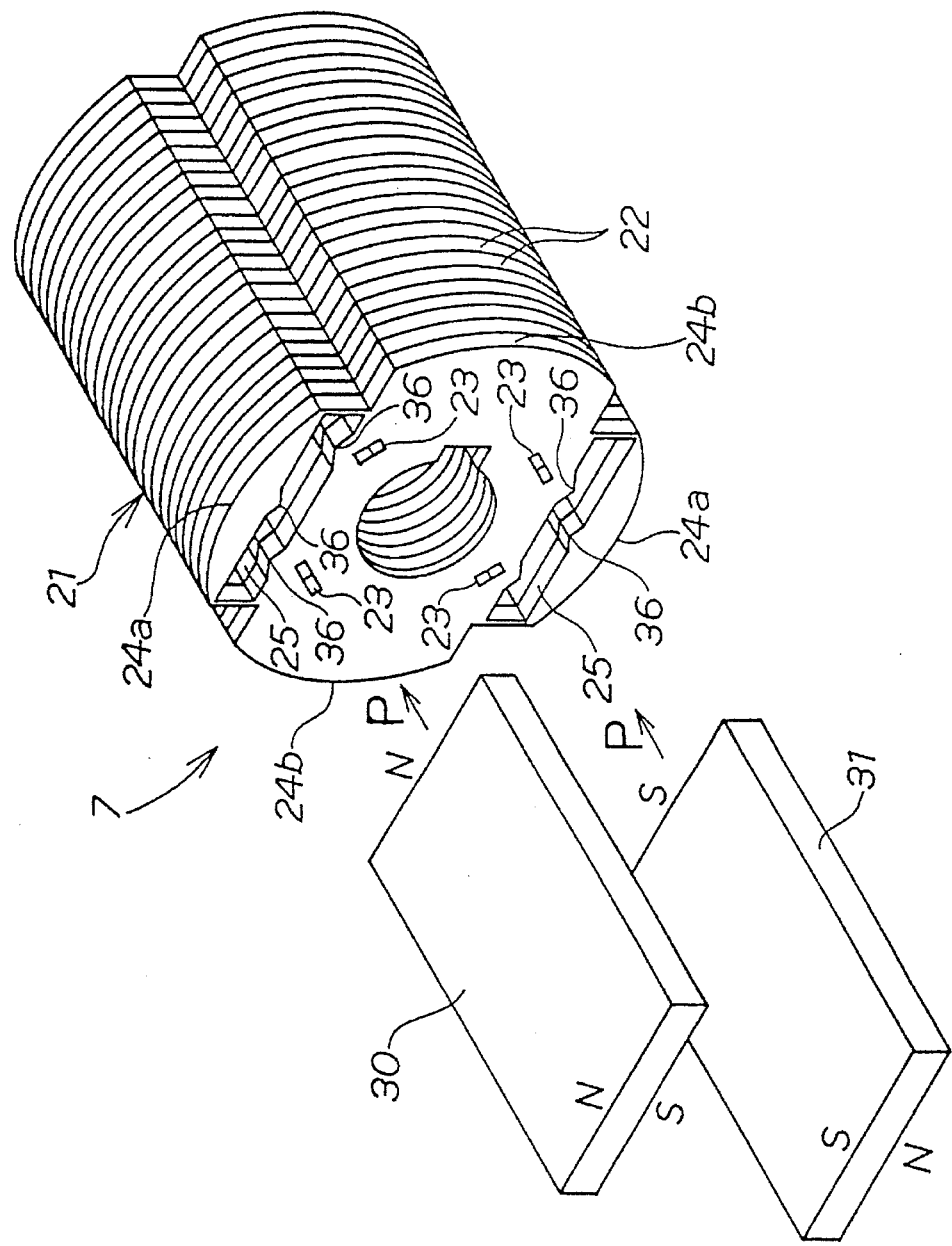
FIG. 18 is an exploded perspective view of a permanent magnet rotor according to the ninth embodiment of the invention.
Figure 19:
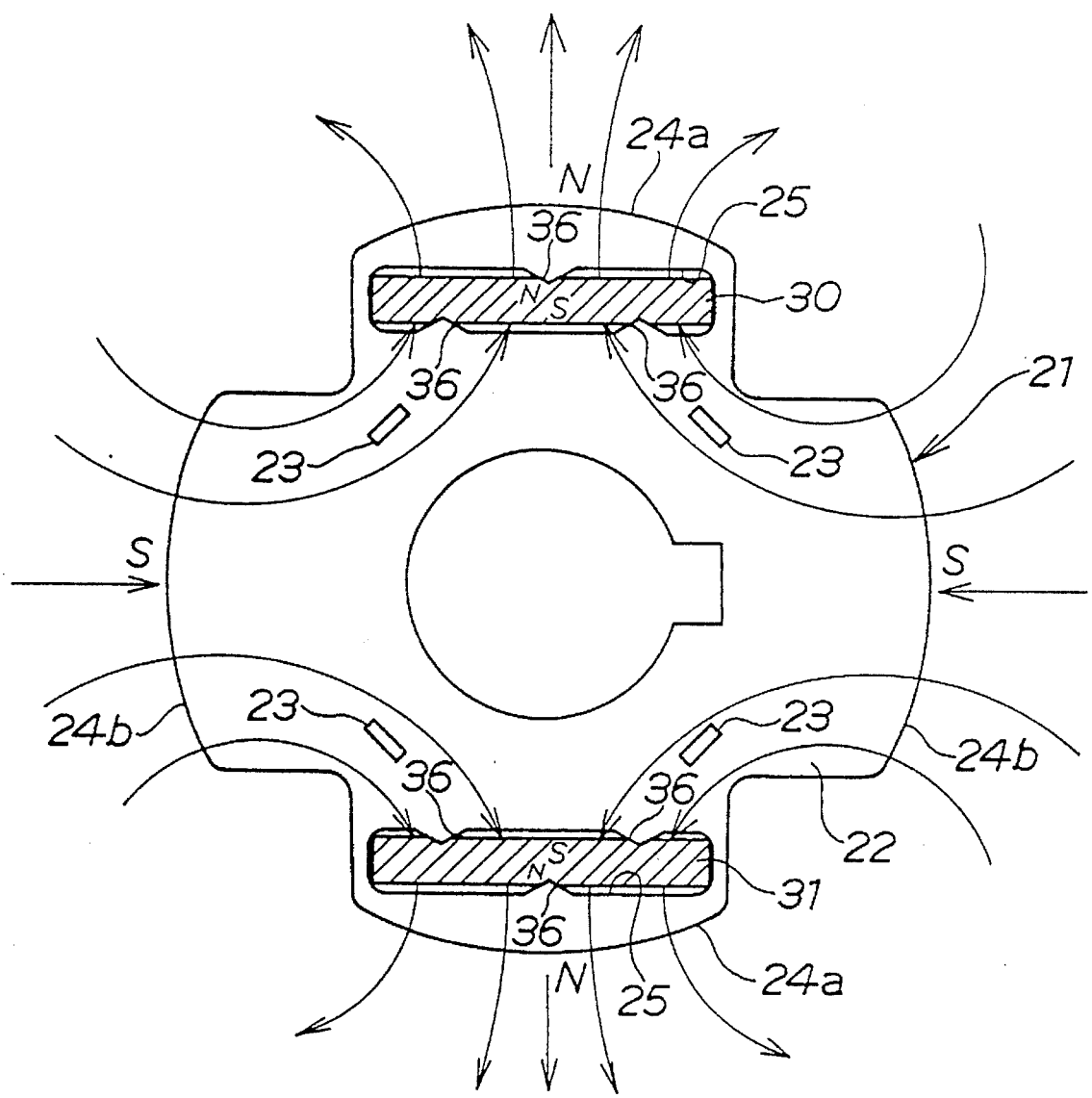
FIG. 19 is a sectional view of the permanent magnet of FIG. 18 as viewed transversely to the rotary shaft thereof.

In FIGS. 18 and 19, the inner peripheries of the silicon steel sheets 22 defining the slots 25 are provided with a plurality of edges 36 each defined by two sides of a triangle projecting inwardly of the slot 25.

The permanent magnets 30 and 31 come into engagement with tips of the respective edges 36 as they are forced into the respective slots 25, and are thereby held within the respective slots 25. By means of the edges 36, the permanent magnets are not in surface contact with the inner peripheral surface of the respective slots 25. Accordingly, the permanent magnets 30 and 31 can be forced into the respective slots 25 with a small force without significant frictional resistance due to the contact between the permanent magnets 30 and 31, and the slots 25.

After forced into the respective slots, the outer surfaces of the permanent magnets are firmly engaged with the tips of the respective edges as shown in the drawings, and the permanent magnets are reliably prevented from dripping off. In this embodiment of permanent magnet rotor 7, no adhesive is used to hold the permanent magnets 30 an 31 within the respective slots 25 and, therefore, there is no fear that the permanent magnets drop off due to dissolution of adhesive in refrigerant or pressurized fluid when the electromotor is used in such refrigerant or pressurized fluid.

Figure 20:
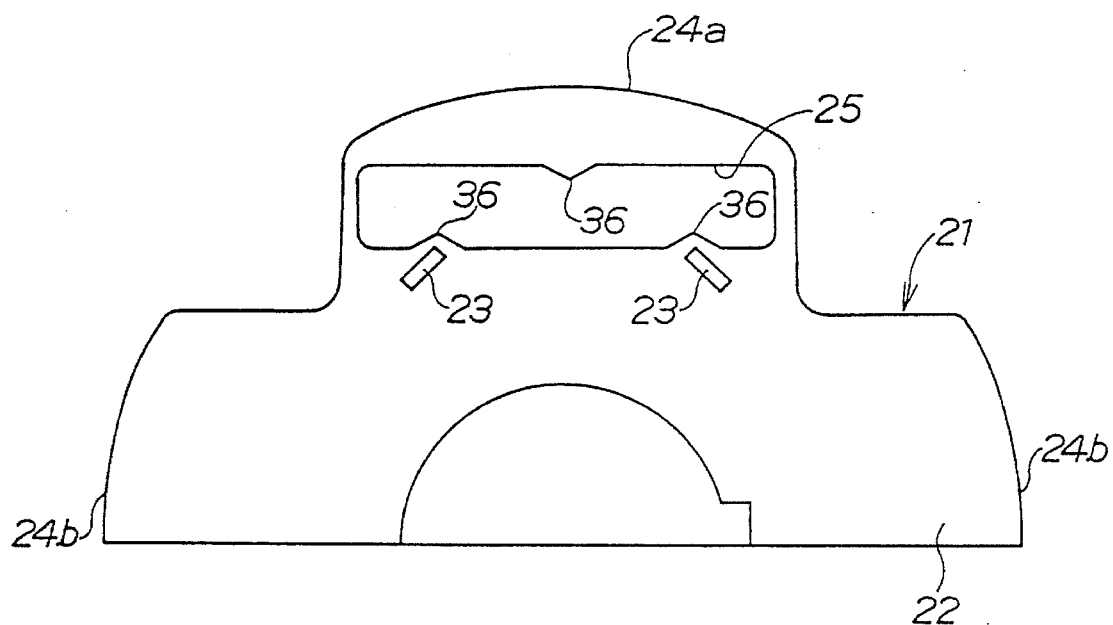
FIG. 20 is a sectional view of part of a yoke for the permanent magnet rotor in an enlarged scale transversely to the axis thereof.

In FIG. 20, the pressed recesses 23 used to laminate the silicon steel sheets 22 together are provided adjacent to the inner peripheries of the silicon steel sheets 22 defining the respective slots 25. The pressed recesses 23 are formed by partially pressing the silicon steel sheets by means of a metal molding press. Formation of these pressed recesses adjacent to the inner peripheries allows this peripheral edge to be deformed by a pressure of the metal mold press so as to form edges 36 projecting inwardly from the respective slots 25. In this way, the process required from formation of the projecting edges 36 is partially eliminated, facilitating manufacturing the permanent magnet rotor.

Figure 21:
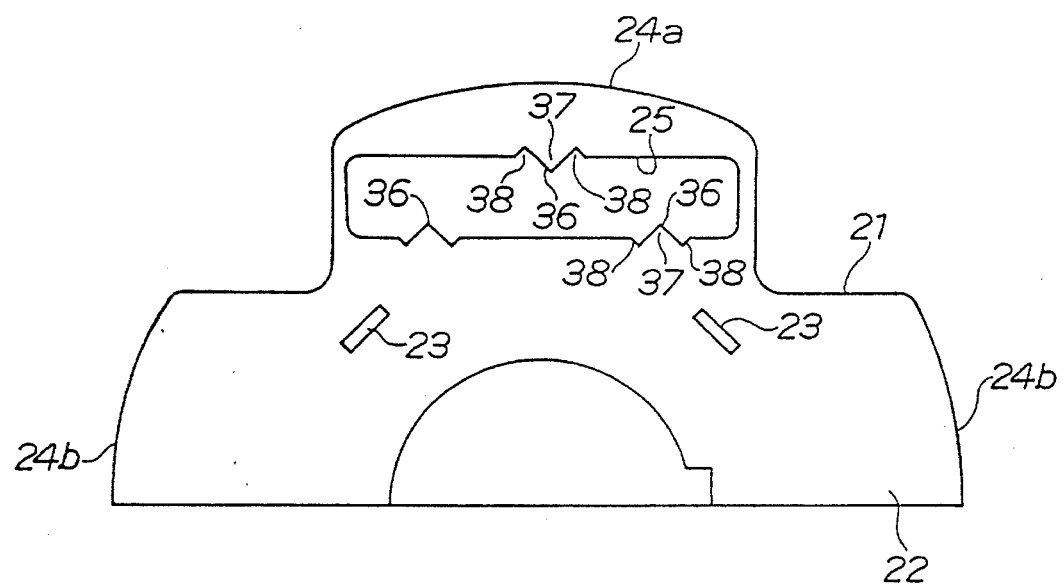
FIG. 21 is a sectional view of part of another yoke for the permanent magnet rotor in an enlarged scale transversely to the axis thereof.

FIG. 21 partially shows the yoke in a variant of this embodiment. In this variant, each of the edges 36 formed in the silicon steel sheets 22 has a triangular projection 37 for engagement with the permanent magnet (not shown) and notches 38 formed on both ends of the base of the triangular projection 37. The base of the triangular projection 37 is located in the inner periphery of the silicon steel sheets 22 defining the slot 25 and in the yoke 21. The triangular projection 37 is connected to the inner periphery of the silicon steel sheets defining the slot by the notches 38.

To firmly engage the permanent magnet, the triangular projection of each edge must have a vertical angle smaller than a predetermined degrees and a predetermined height. Excessively large vertical angle of the triangular projection will require a correspondingly large force to insert the permanent magnet into the slot. If the edge does not have the predetermined height, the edge will be deformed as the permanent magnet is forced into the slot and will not function as expected. However, providing the inner periphery of the silicon steel sheets defining the slot with the edge having the desired vertical angle and height reduce the cross sectional area of the permanent magnet which can be forced into the associated slot or enlarged the slot. This is contradictory to the demand for compactness and high efficiency of the brushless electromotor.

The edge 36 in this specific embodiment includes, as mentioned above, the triangular projection 37 and the pair of notches 38. Such arrangement not only facilitates insertion of the permanent magnet without enlarging the slot 25 or reducing the sectional area of the permanent magnet but also prevents the permanent magnet from accidentally dropping off by effective engagement with the permanent magnet after the latter is forced into the slot.

Though the present embodiment has been explained as including the triangular projection adapted to be engaged with the permanent magnet, the shape of the projection is not limited to the triangle and, for example, the projection having a small radius semi-circular tip may also be used.

Furthermore, the yoke is not limited to that consisting of the laminated silicon steel sheets and, for example, the yoke may also be of integral metallic block having the slot into which the permanent magnet is forced and the projections formed on the inner wall of the slot adapted to be engaged with the permanent magnet.

The tenth embodiment of the invention will be described. This specific embodiment is characterized by an arrangement such that after the permanent magnets 30 and 31, which are shorter than the axial length of the yoke 21, are inserted into the respective slots 25, resultant cavities defined within the respective slots are filled with suitable putty having weighs selected depending on a gravity center displacement of the object to be rotationally driven and the balance weights 39 are formed as the putty is cured or hardened.

Figure 22:
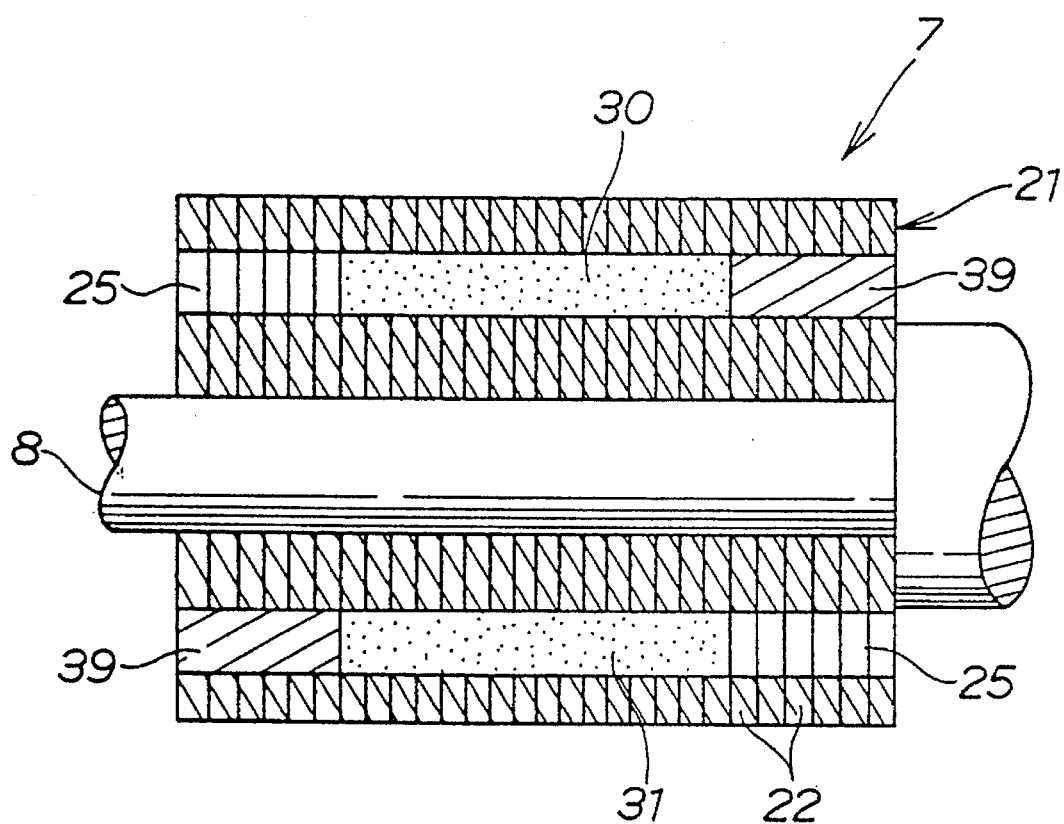
FIG. 22 is a sectional view, taken along the axis, of a permanent magnet rotor according to the tenth embodiment of the invention.

FIG. 22 shows the permanent magnet rotor 7 provided with the balance weights formed in the above-mentioned manner and, in this permanent magnet rotor 7, the respective permanent magnets 30 and 31 are shorter than the axial length of the yoke 21 so as to define the cavities within the respective slots 25. As shown in the figure, these cavities are filled with the putty composed of fine metallic powder mixed with resin and this putty is hardened or solidified to form the respective balance weights 39.

The yoke 21 of permanent magnet rotor 7 contains these balance weights 39 on the sides of the respective permanent magnets 30 and 31 which are axially opposed to each other and, therefore, the gravity center of the yoke 21 is displaced toward the axially opposite ends of the yoke 21. Consequently, a vibration mode tuning with would other wise occur in a total system including the rotary shaft and the eccentric rotor can be avoided and vibrations of the eccentric rotor due to its rotation can be absorbed.

In FIG. 22, the balance weights 39 are weight-adjusted so as to fulfill such purpose. More specifically, a ratio of metallic powder to resin is so selected that the balance weights 39 may compensate the vibration mode tuning possibly occurring in the total system comprising the rotary shaft and the eccentric rotor, with the respective cavities in the slots 25 being filled with the putty mixed at this ratio. Alternatively, the amount of putty is adjusted for each balance weight 39 and the respective cavities are filled with different amount of putty which defines the balance weight 39. It should be understood that the putty is not limited to the mixture of metallic powder and resin, but aluminum die cast material may also be used.

As described above, the balance weights for this embodiment of the permanent magnet rotor are formed within the yoke and have no portions projecting outwardly from the axially opposite ends of the yoke. Therefore, the balance weights encounter no fluid resistance during rotation. Additionally, there is no fear that the balance weights fly off under a centrifugal force due to rotation of the permanent magnets since the balance weights are provided within the yoke. This makes it possible to obtain the permanent magnet rotor which is excellent in the rotational drive efficiency and free from the fear that the balance weights might accidentally fly off during operation.

Finally, the eleventh embodiment of the invention will be described. This embodiment is characterized in that the rotor contains therein a cooling mechanism.

Figure 23:
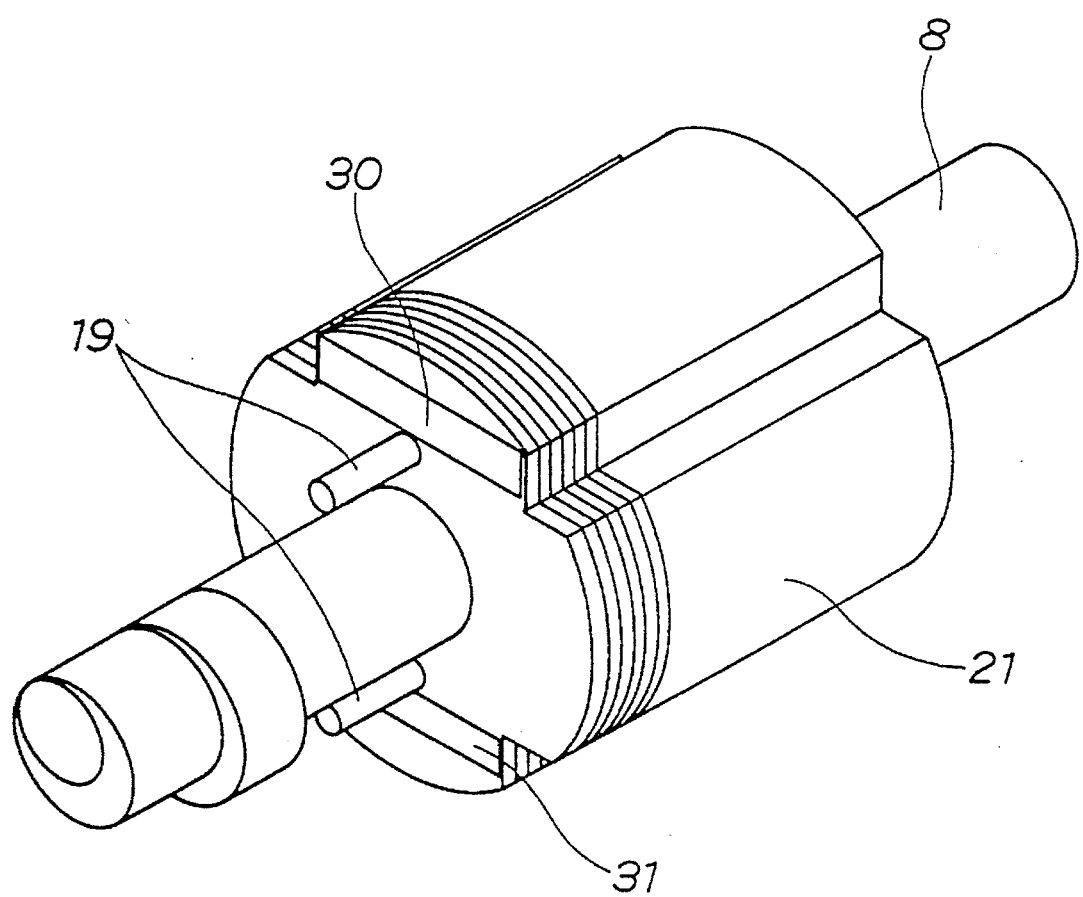
FIG. 23 is a perspective view of a permanent magnet rotor according to the eleventh embodiment of the invention.

In FIG. 23, a pair of heat pipes 19 are embedded in the yoke 21 to be adjacent to the respective permanent magnets 30 and 31, and these heat pipes 19 are filled with operating fluid by which a heat exchange occurs. More specifically, a heat absorbing section of each heat pipe 19 lying within the yoke 21 absorbs internal heat of the yoke and a radiating section projecting outwardly from the yoke radiates the internal heat. The operating fluid cooled by heat exchange with atmosphere returns to the heat absorbing section of the heat pipe 19. In this manner, the heat pipes 19 continuously radiate the internal heat of the permanent magnets as well as the yoke to the outside, cooling the permanent magnet rotor.

Figure 24:
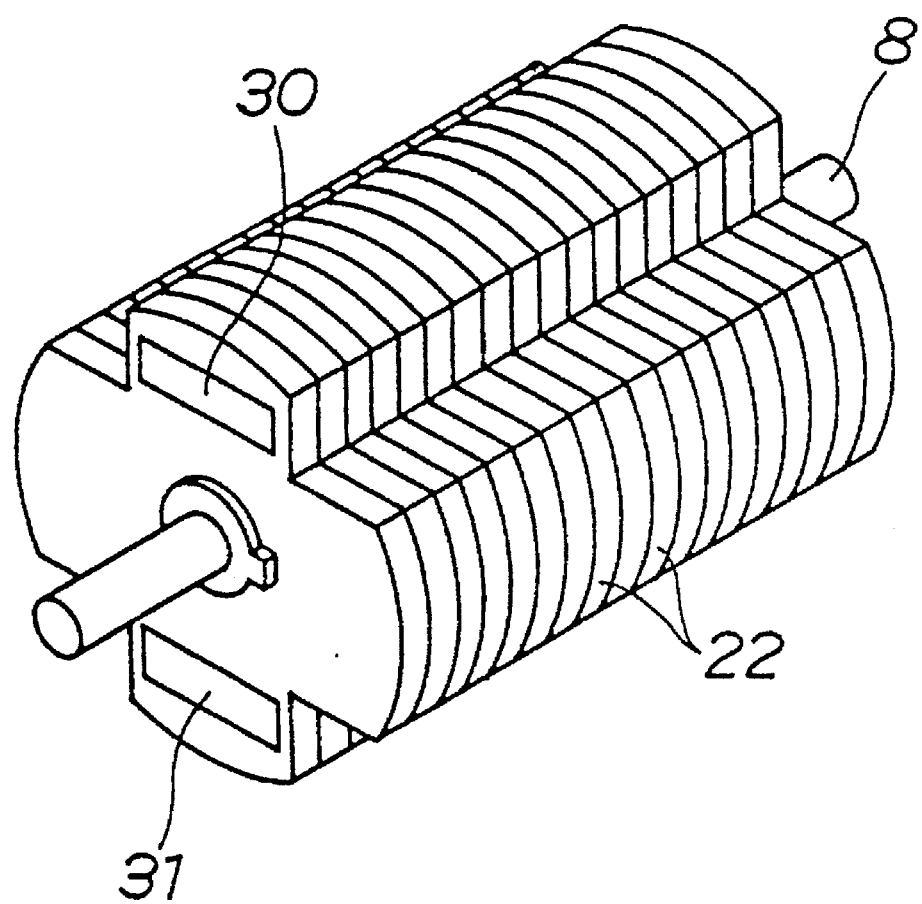
FIG. 24 is a perspective view of a variant of this permanent magnet rotor.
Figure 25:
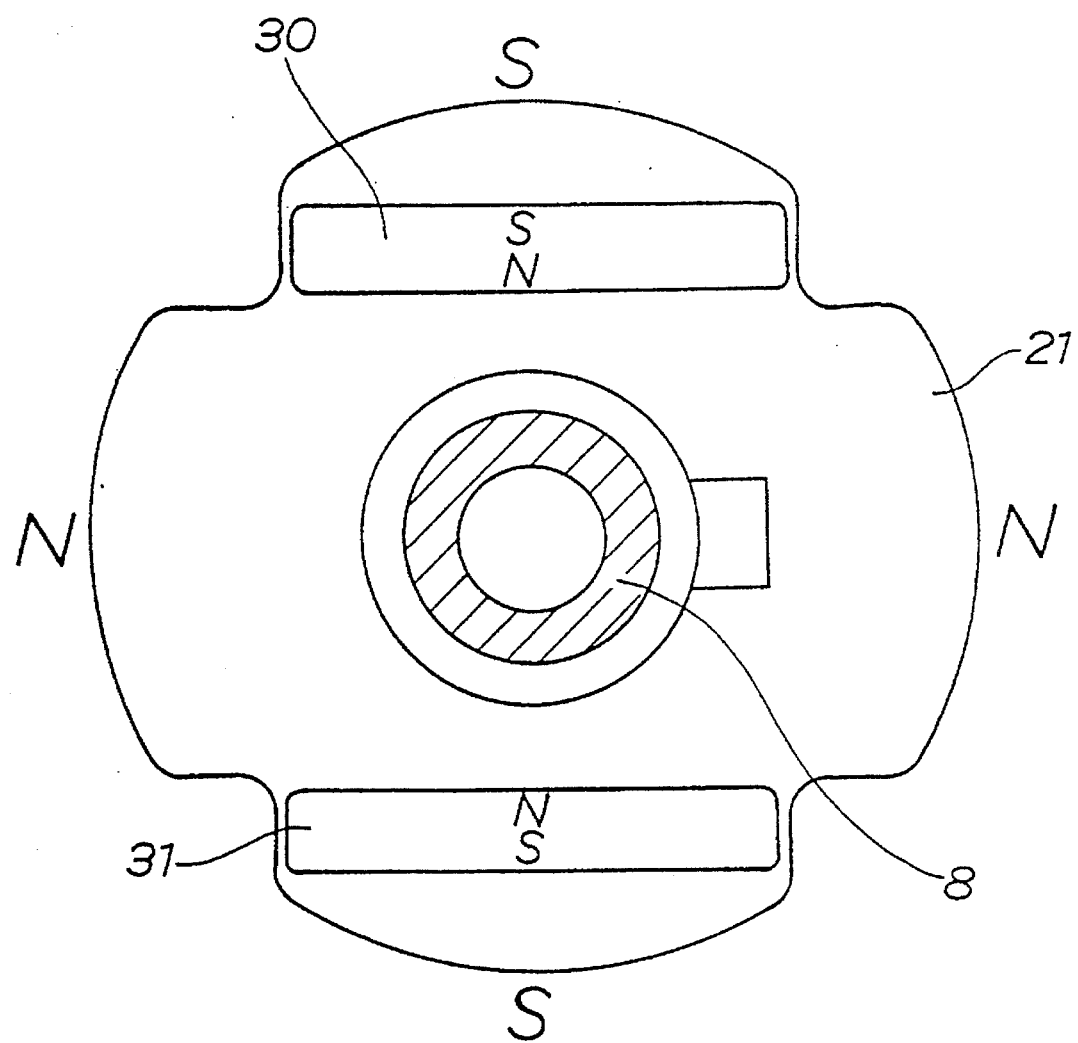
FIG. 25 is a transverse sectional view of the rotary shaft for the this embodiment.

FIGS. 24 and 25, there is shown a variant of this embodiment, in which the rotary shaft 8 serves also as the heat pipe. Such arrangement provides the permanent magnet rotor which is fully closed and able to radiate the internal heat to the outside. It should be understood that such arrangement can utilize sintered alloy, massive iron or cold rolled steel (SPCC) for the yoke.

Now a method of making the rotor according to the invention will be described in detail.

As apparent from the above description, the permanent magnet rotor of the invention is manufactured by the method generally includes the steps of forming the yoke provided with the slots adapted to receive the respective permanent magnets, forming the permanent magnets each configured to match the respective slots of the yoke, and forcing these permanent magnets into the respective slots of the yoke.

More specifically, the yoke 21 and the permanent magnets 30 and 31 are separately manufactured, then these permanent magnets thus manufactured are inserted into the yoke to form the permanent magnet rotor 7. The yoke 21 is formed by laminating a plurality of silicon steel sheets 22 together and each silicon steel sheet 22 is configured by stamping out to have the magnetic poles 24 (24a, 24b, 24c) along the outer periphery and the openings inside the magnetic poles through which the respective permanent magnets extend. In addition, each silicon steel sheet 22 is provided with the rectangular pressed recesses 23 formed by pressing with the metal die.

The pressed recesses 23 of the respective silicon steel sheets 22 may be forced one into another to laminate the silicon steel sheets integrally and thereby to form the yoke 21. The openings of the respective silicon steel sheets 22 are aligned with one another to from together the respective slots 25 to receive the associated permanent magnets 30 and 31.

The permanent magnet are manufactured by a method generally includes the steps of mixing powder of suitable magnetic material with epoxy binder, pouring this mixture into a mold and molding the mixture in a magnetic field into a given configuration; curing this molded mixture by heat treatment; and surface-cutting this molded and cured mixture to be conformed to the slot 25 of the yoke 21.

The permanent magnets obtained in the above mentioned manner are forced into the respective slots 25 of the yoke 21 to complete the permanent magnet rotor 7.

Another method of making the permanent magnets for the brushless electromotor will be described, which is devised particularly to facilitate manufacturing of the permanent magnet rotor containing therein the permanent magnets of a relatively complicated shape without damaging the permanent magnets during assembling.

This alternative method includes the steps of providing the slots extending through the yoke, filling the slots with powder of suitable magnetic material mixed with epoxy binder, compression-molding this mixture in a magnetic field applied in the radial direction in relation to the rotary shaft of the rotor and curing the compression-molded mixture with heat treatment to form the permanent magnets directly within the slots of the yoke.

Figure 26:
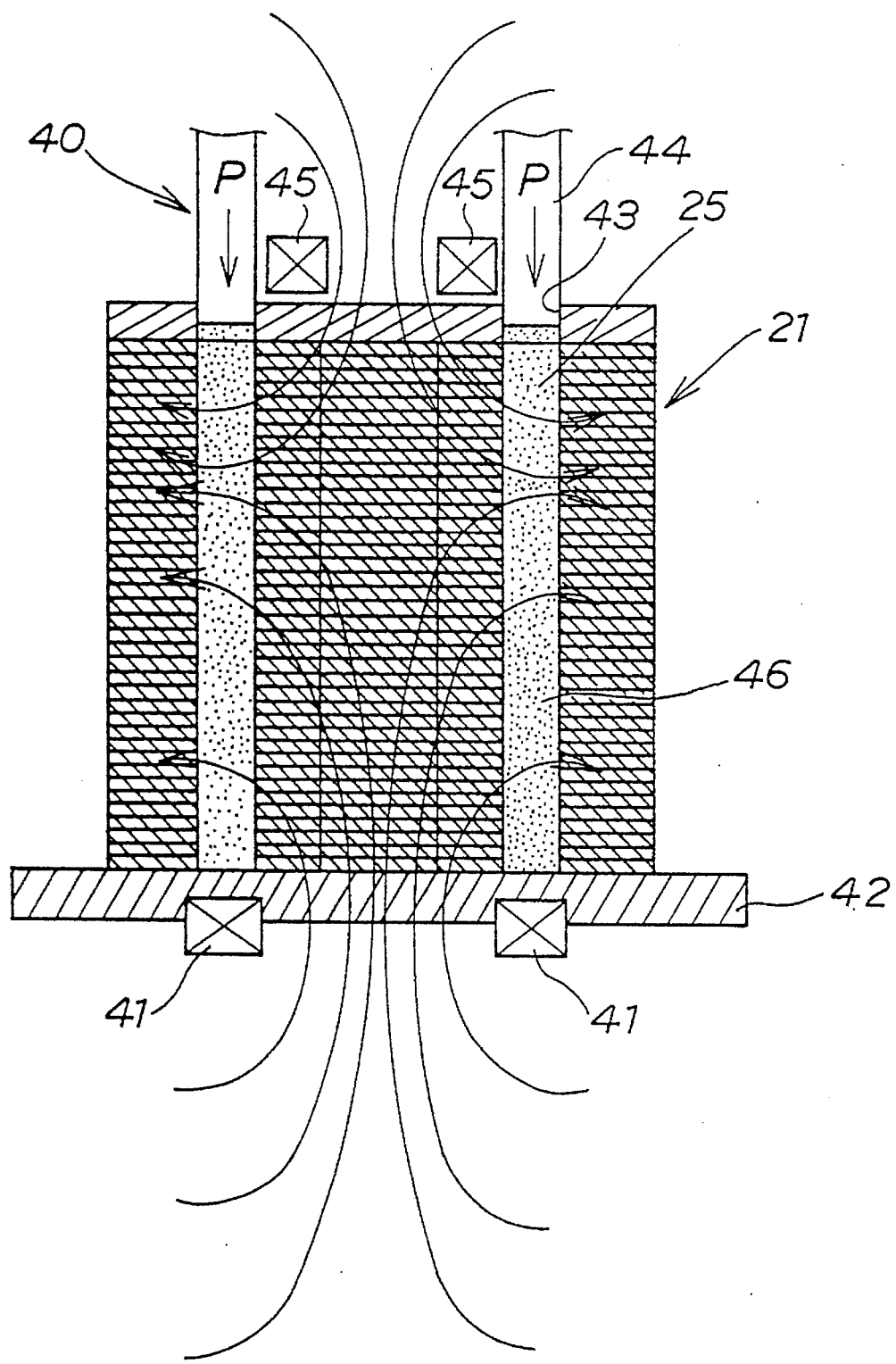
FIG. 26 is a sectional side view of this permanent magnet rotor, illustrating one of steps in manufacturing.

FIG. 26 shows the process of forming the permanent magnets within the slots. As shown, the yoke 21 is placed on a pedestal 42 having coils 41. On the top of the yoke 21, there are placed jigs 40 provided with openings 43 each having the same configuration as that of the slot 25 and compressing pistons 44. Each jig 40 is additionally provided with a coil 45. The slots 25 of the yoke 21 is filled with a raw material 46 of the permanent magnets composed of the magnetic powder mixed with the epoxy binder. In view of the fact that the raw material 46 of the permanent magnets has its volume reduced as it is compressed, each slot is filled with an amount of the raw material larger than the volume of the slot so that the raw material 46 is partially pressed into the opening 43 of the jig 40.

Electric current is applied to the coils 41 and 45 to generate magnetic flux extending, as shown, through the center of the yoke 21, then through the respective slots from the inside toward the outside and to thereby provide a magnetic field intersecting the raw material 46 of the permanent magnets filling the respective slots 25. The compressing pistons 44 are then forcibly moved as by, for example, oil pressure in a direction indicated by P in FIG. 26 and thereby the raw material 46 is compression-molded into the permanent magnets.

After the compression-molding, the yoke 21 is removed from the jigs 40 and the pedestal 42, and subjected to the heat treatment at a temperature of 100° C. to 150° C. to cure or harden the permanent magnets contained therein.

In this way, the permanent magnets are formed within the respective slots 25 of the rotor 7, as shown in FIG. 4 and other Figs. These permanent magnets have their inner sides magnetized as S-poles and their outer sides as N-poles under the effect of the magnetic field applied during the compression-molding. The permanent magnets 30 and 31 are placed with their magnetic pole surfaces having the same polarity being opposed to each other so that their mutual repulsion causes the magnetic flux to extend from the magnetic pole 24a to the magnetic pole 24b of the yoke 21, as illustrated. This magnetic flux intersects the stator (not shown) of the electromotor provided in the proximity of the outer periphery of the yoke and interaction between the magnetic flux and the stator causes the permanent magnet rotor 7 to be rotationally driven.

As mentioned above, this embodiment of the method for making the permanent magnet rotor allows the permanent magnets to be easily manufactured without damaging the magnets as they are forced into the respective slots of the yoke, because the permanent magnets are formed directly within the yoke. Furthermore, this unique method of the invention allows the permanent magnets of a relatively complicated shape to be formed within the yoke and such feature presents a significant effect particularly for so-called skewed permanent magnet rotor in which the yoke has the magnetic poles gradually displaced along the axial direction of the permanent magnet rotor.

Figure 27:
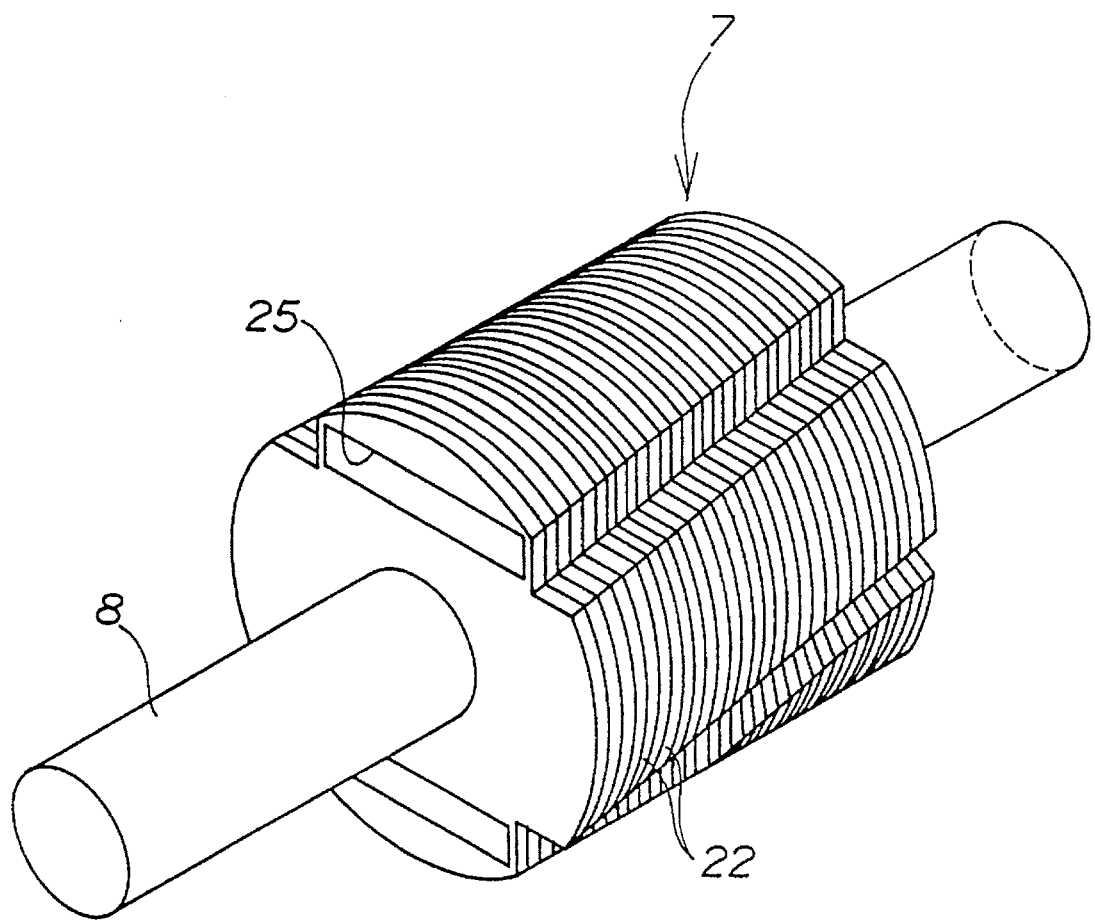
FIG. 27 is a perspective view of a skewed permanent magnet rotor.
Figure 28:
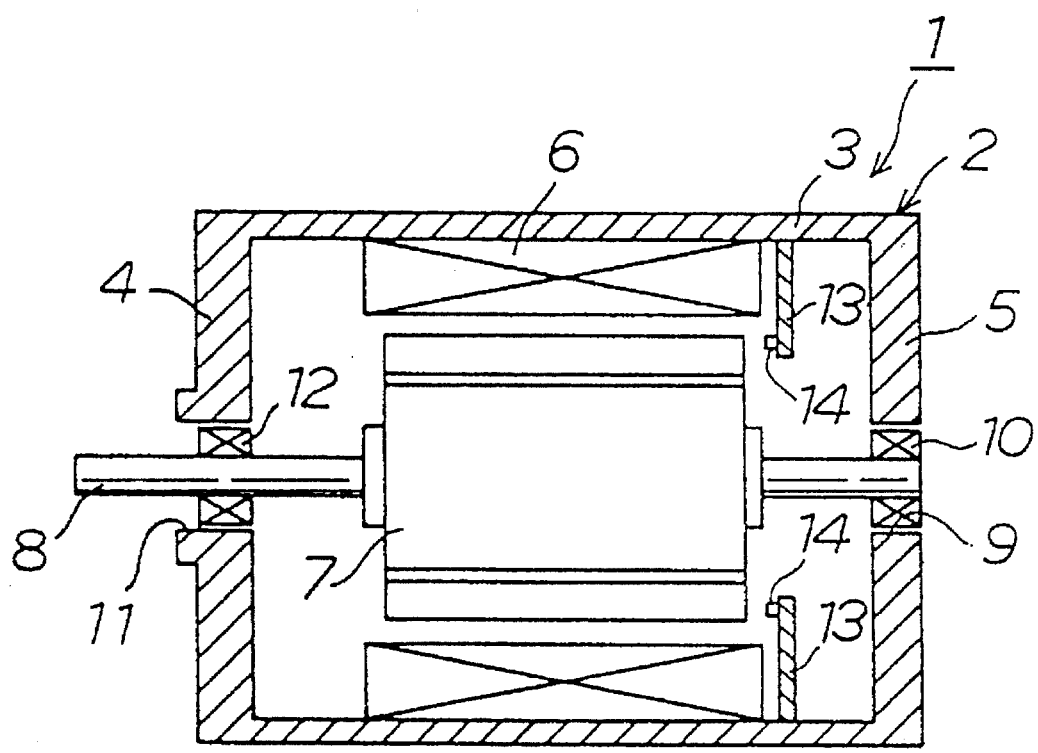
FIG. 28 is a longitudinal section of a conventional brushless electromotor.
Figure 29:
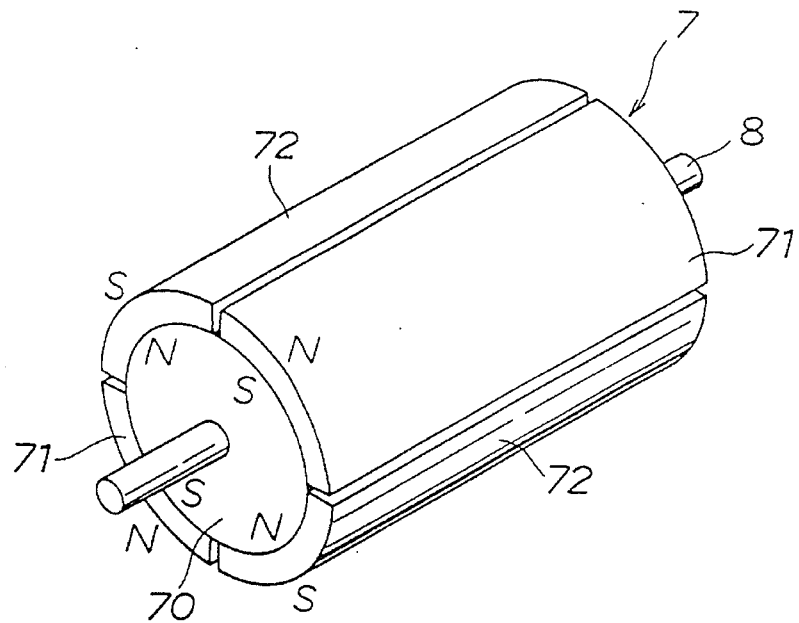
FIG. 29 is a perspective view of a conventional permanent magnet rotor.
Figure 30:
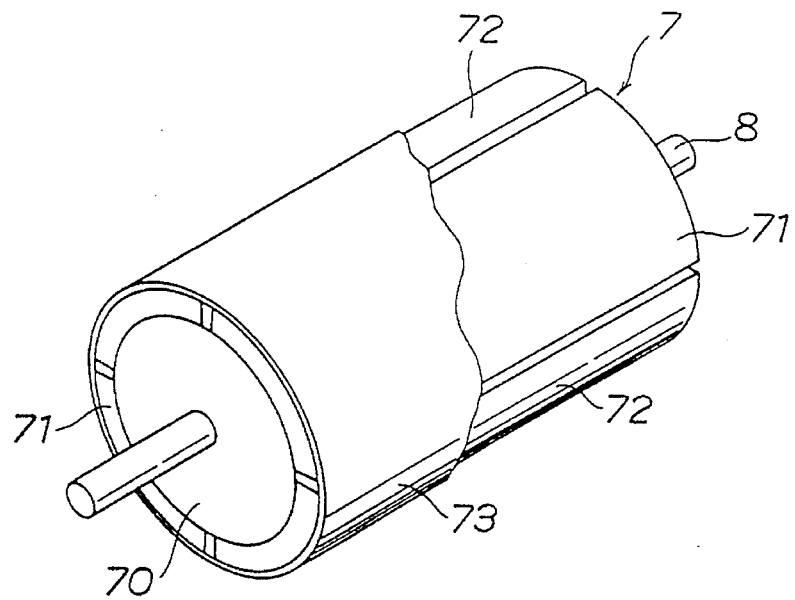
FIG. 30 is a perspective view of another conventional permanent magnet rotor which is provided with a protective member.

In FIG. 27, the skewed permanent magnet rotor 7 is obtained by laminating a plurality of silicon steel sheets 22 with the individual silicon sheets being successively displaced by a small angle around the rotary shaft 8. The respective slots 25 defined in such permanent magnet rotor 7 provided helical curves. Even within the slots 25 of such complicated shape, the permanent magnets 30 and 31 can be directly formed by the same method as described above in reference with FIG. 26.

Although the method of the invention described above particularly for the permanent magnet rotor in which the yoke contains therein a pair of permanent magnets and is provided along the outer periphery with hour magnetic poles alternately magnetized in N- and S-polarities by mutual repulsion of the pair of permanent magnets, the method of the invention is not limited to production of such permanent magnet rotor having the constitution as mentioned above. Namely, the method may be utilized to form the permanent magnets directly within the yoke also in the permanent magnet rotor having along the outer periphery an optional number of magnetic poles or even in the permanent magnet rotor having the permanent magnets provided in association with the respective magnetic poles.

Although the method of the invention has been described above on the assumption that each permanent magnet has the rectangular cross-section, the permanent magnet may have any cross-sectional shape.

The method described above allows the permanent magnet of high efficiency to be easily obtained without need for surface-cutting of the permanent magnets during the manufacturing process. In addition, the method of the invention allows the permanent magnets to be efficiently used because there is no fear that the permanent magnets might be damaged during the manufacturing process.

The method of the invention can be employed for the slots of relatively complicated configurations, since the permanent magnets are formed directly within the respective slots of the yoke. The method of the invention not only allows the permanent magnets of relatively complicated cross-sectional shapes to be easily formed but also allows even the permanent magnet rotor having the curved slots to be easily manufactured.

Industrial Usefulness

As apparent from the above description, the permanent rotor according to the invention is useful for the brushless electromotor having a simplified structure and high efficiency and suitable for high speed operation.

We claim:

1. A rotor having permanent magnets for a brushless electromotor, comprising:
   a yoke made from a plurality of silicon steel sheets laminated together so as to have an even number of magnetic poles;
   at least one slot provided in one of said magnetic poles;
   at least one permanent magnet provided in said slot; and
   at least one slit extending inwardly from a periphery of said one of said magnetic poles along a direction of magnetic flux for providing a uniform distribution of magnetic flux on said permanent magnet, wherein said one of said magnetic poles is provided with a pair of bridges on opposite sides of said slot for connecting a tip portion to a base portion of said one of said magnetic poles, said bridges are provided on an outside thereof with a groove for limiting passage of magnetic flux.

2. A rotor having permanent magnets for a brushless electromotor, comprising:
   a yoke made from a plurality of silicon steel sheets laminated together so as to have an even number of magnetic poles;
   at least one slot provided in one of said magnetic poles;
   at least one permanent magnet provided in said slot; and
   at least one slit extending inwardly from a periphery of said one of said magnetic poles along a direction of magnetic flux for providing a uniform distribution of magnetic flux on said permanent magnet, wherein said one of said magnetic poles is provided with a single bridge on a forward side of said slot with respect to a direction of rotation.

3. A rotor according to claim 2, wherein said single bridge has such a width that a leakage flux flows therethrough and said permanent magnet has such a thickness that a leakage flux is generated on opposite sides thereof.

4. A rotor having permanent magnets for a brushless electromotor, comprising:
   a yoke made from a plurality of silicon steel sheets laminated together so as to have an even number of magnetic poles;
   a shaft provided through said yoke;
   at least one slot provided in one of said magnetic poles;
   at least one permanent magnet provided in said slot; and
   at least one heat pipe provided in said yoke in thermal contact with said permanent magnet.

5. A rotor according to claim 4, which further comprises a through hole provided in said yoke along said shaft at a position closer to said slot than said shaft.

* * * * *